US011178376B1

(12) United States Patent
Tichenor et al.

(10) Patent No.: US 11,178,376 B1
(45) Date of Patent: Nov. 16, 2021

(54) METERING FOR DISPLAY MODES IN ARTIFICIAL REALITY

(71) Applicant: Facebook Technologies, LLC, Menlo Park, CA (US)

(72) Inventors: James Tichenor, Seattle, WA (US); Hayden Schoen, Tacoma, WA (US); Yeliz Karadayi, Seattle, WA (US)

(*) Notice: Subject to any disclaimer, the term of this patent is extended or adjusted under 35 U.S.C. 154(b) by 0 days.

(21) Appl. No.: 17/013,416

(22) Filed: Sep. 4, 2020

(51) Int. Cl.
| H04N 13/122 | (2018.01) |
| H04N 13/332 | (2018.01) |
| G02B 27/01 | (2006.01) |
| H04N 13/00 | (2018.01) |

(52) U.S. Cl.
CPC ....... *H04N 13/122* (2018.05); *G02B 27/0172* (2013.01); *H04N 13/332* (2018.05); *G02B 2027/014* (2013.01); *H04N 2013/0081* (2013.01)

(58) Field of Classification Search
CPC ............... H04N 13/122; H04N 13/332; H04N 2013/0081; G02B 27/0172; G02B 2027/014
See application file for complete search history.

(56) References Cited

U.S. PATENT DOCUMENTS

| 6,842,175 | B1 | 1/2005 | Schmalstieg et al. |
| 7,701,439 | B2 | 4/2010 | Hillis et al. |
| 8,493,383 | B1 | 7/2013 | Cook et al. |
| 8,558,759 | B1 | 10/2013 | Gomez et al. |
| 8,831,794 | B2 | 9/2014 | Persaud et al. |
| 8,902,227 | B2 | 12/2014 | Harrison |
| 8,947,351 | B1 | 2/2015 | Noble |
| 9,052,161 | B2 | 6/2015 | Page |
| 9,117,274 | B2 | 8/2015 | Liao et al. |
| 9,159,140 | B2 | 10/2015 | Hoof et al. |
| 9,292,089 | B1 | 3/2016 | Sadek |
| 9,342,230 | B2 | 5/2016 | Bastien et al. |
| 9,412,010 | B2 | 8/2016 | Kawaguchi et al. |

(Continued)

FOREIGN PATENT DOCUMENTS

WO 2018235371 A1 12/2018

OTHER PUBLICATIONS

Hincapie-Ramos, J.D. et al. "GyroWand: IMU-based raycasting for augmented reality head-mounted displays." Proceedings of the 3rd ACM Symposium on Spatial User Interaction, Aug. 2015, pp. 89-98.

(Continued)

*Primary Examiner* — Jitesh Patel
(74) *Attorney, Agent, or Firm* — Potomac Law Group, PLLC

(57) ABSTRACT

Aspects of the present disclosure are directed to setting a display mode for a virtual object based on a display mode timer that is controlled by context factors. An artificial reality system can associate one or more virtual objects with a corresponding display mode timer. Various ranges on the display mode timer can be mapped to different display modes that the virtual object can assume. The display mode timer can be adjusted to add time based on a determination of a user focusing on the virtual object or other context factors. Display mode timers can also have rules for setting other display mode timer properties, such as how quickly the display mode timer runs down, that are evaluated based on context factors.

20 Claims, 13 Drawing Sheets

(56) References Cited

U.S. PATENT DOCUMENTS

| | | | |
|---|---|---|---|
| 9,477,368 B1 | 10/2016 | Filip et al. | |
| 9,526,983 B2 | 12/2016 | Lin | |
| 9,811,721 B2 | 11/2017 | Tang et al. | |
| 9,817,472 B2 | 11/2017 | Lee et al. | |
| 9,818,231 B2 | 11/2017 | Coffey et al. | |
| 9,821,224 B2 | 11/2017 | Latta et al. | |
| 9,886,096 B2 | 2/2018 | Kang et al. | |
| 9,940,750 B2 | 4/2018 | Dillavou et al. | |
| 10,019,131 B2 | 7/2018 | Welker et al. | |
| 10,043,279 B1 | 8/2018 | Eshet | |
| 10,067,636 B2 | 9/2018 | Palmaro | |
| 10,102,676 B2 | 10/2018 | Yajima et al. | |
| 10,133,342 B2 | 11/2018 | Mittal et al. | |
| 10,163,001 B2 | 12/2018 | Kim et al. | |
| 10,168,873 B1 | 1/2019 | Holz et al. | |
| 10,181,218 B1 | 1/2019 | Goetzinger, Jr. et al. | |
| 10,220,303 B1 | 3/2019 | Schmidt et al. | |
| 10,235,807 B2 | 3/2019 | Thomas et al. | |
| 10,248,284 B2 | 4/2019 | Itani et al. | |
| 10,303,259 B2 | 5/2019 | Brunner et al. | |
| 10,325,184 B2 | 6/2019 | Brunner et al. | |
| 10,339,721 B1 | 7/2019 | Dascola et al. | |
| 10,423,241 B1 | 9/2019 | Pham et al. | |
| 10,451,875 B2 | 10/2019 | Sutherland et al. | |
| 10,473,935 B1 | 11/2019 | Gribetz et al. | |
| 10,481,755 B1 | 11/2019 | Ngo et al. | |
| 10,521,944 B2 | 12/2019 | Sareen et al. | |
| 10,558,048 B2 | 2/2020 | Fukuda et al. | |
| 10,592,067 B2 | 3/2020 | Merdan et al. | |
| 10,617,956 B2 | 4/2020 | Black et al. | |
| 10,649,212 B1 | 5/2020 | Burns et al. | |
| 10,657,694 B2 | 5/2020 | Sharma et al. | |
| 10,726,266 B2 | 7/2020 | Sharma et al. | |
| 10,818,071 B1 | 10/2020 | Hoppe et al. | |
| 10,818,088 B2 | 10/2020 | Jones et al. | |
| 10,824,247 B1 | 11/2020 | Henrikson et al. | |
| 10,890,653 B2 | 1/2021 | Giusti et al. | |
| 10,922,894 B2 | 2/2021 | Sculli et al. | |
| 10,970,936 B2 | 4/2021 | Osborn et al. | |
| 11,030,237 B2 | 6/2021 | Itani et al. | |
| 11,077,360 B2 | 8/2021 | Ohashi | |
| 2004/0224670 A1* | 11/2004 | Hull | H04M 1/22 455/412.1 |
| 2007/0003915 A1 | 1/2007 | Templeman | |
| 2008/0089587 A1 | 4/2008 | Kim et al. | |
| 2010/0306716 A1 | 12/2010 | Perez | |
| 2011/0009241 A1 | 1/2011 | Lane et al. | |
| 2011/0032257 A1 | 2/2011 | Peterson et al. | |
| 2011/0154266 A1 | 6/2011 | Friend et al. | |
| 2011/0254846 A1 | 10/2011 | Lee et al. | |
| 2011/0267265 A1 | 11/2011 | Stinson | |
| 2011/0310220 A1 | 12/2011 | McEldowney | |
| 2012/0069168 A1 | 3/2012 | Huang et al. | |
| 2012/0143358 A1 | 6/2012 | Adams et al. | |
| 2012/0157198 A1 | 6/2012 | Latta et al. | |
| 2012/0188279 A1 | 7/2012 | Demaine | |
| 2012/0206345 A1 | 8/2012 | Langridge | |
| 2012/0256967 A1* | 10/2012 | Baldwin | G06F 3/0485 345/684 |
| 2012/0275686 A1 | 11/2012 | Wilson et al. | |
| 2012/0293544 A1 | 11/2012 | Miyamoto et al. | |
| 2013/0002551 A1 | 1/2013 | Imoto et al. | |
| 2013/0042296 A1 | 2/2013 | Hastings et al. | |
| 2013/0063345 A1 | 3/2013 | Maeda | |
| 2013/0125066 A1 | 5/2013 | Klein et al. | |
| 2013/0147793 A1 | 6/2013 | Jeon et al. | |
| 2013/0265220 A1 | 10/2013 | Fleischmann et al. | |
| 2014/0125598 A1 | 5/2014 | Cheng et al. | |
| 2014/0168217 A1 | 6/2014 | Kim et al. | |
| 2014/0201666 A1 | 7/2014 | Bedikian et al. | |
| 2014/0236996 A1 | 8/2014 | Masuko et al. | |
| 2014/0357366 A1 | 12/2014 | Koganezawa et al. | |
| 2014/0375691 A1 | 12/2014 | Kasahara | |
| 2015/0009238 A1* | 1/2015 | Kudalkar | G06F 3/013 345/661 |
| 2015/0035746 A1 | 2/2015 | Cockburn et al. | |
| 2015/0054742 A1 | 2/2015 | Imoto et al. | |
| 2015/0062160 A1 | 3/2015 | Sakamoto et al. | |
| 2015/0153833 A1 | 6/2015 | Pinault et al. | |
| 2015/0160736 A1 | 6/2015 | Fujiwara | |
| 2015/0169076 A1 | 6/2015 | Cohen et al. | |
| 2015/0181679 A1 | 6/2015 | Liao et al. | |
| 2015/0206321 A1 | 7/2015 | Scavezze et al. | |
| 2015/0220150 A1 | 8/2015 | Plagemann et al. | |
| 2015/0260474 A1 | 9/2015 | Rublowsky et al. | |
| 2015/0261659 A1 | 9/2015 | Bader et al. | |
| 2016/0110052 A1 | 4/2016 | Kim et al. | |
| 2016/0147308 A1 | 5/2016 | Gelman et al. | |
| 2016/0170603 A1 | 6/2016 | Bastien et al. | |
| 2016/0171771 A1 | 6/2016 | Pedrotti et al. | |
| 2016/0378291 A1 | 12/2016 | Pokrzywka | |
| 2017/0060230 A1 | 3/2017 | Faaborg et al. | |
| 2017/0060319 A1 | 3/2017 | Seo et al. | |
| 2017/0109936 A1 | 4/2017 | Powderly et al. | |
| 2017/0123487 A1 | 5/2017 | Hazra et al. | |
| 2017/0139478 A1 | 5/2017 | Jeon et al. | |
| 2017/0192513 A1 | 7/2017 | Karmon et al. | |
| 2017/0203213 A1 | 7/2017 | Stafford | |
| 2017/0205892 A1 | 7/2017 | Petrovskaya et al. | |
| 2017/0236320 A1 | 8/2017 | Gribetz et al. | |
| 2017/0237789 A1 | 8/2017 | Harner et al. | |
| 2017/0243401 A1 | 8/2017 | Tanaka et al. | |
| 2017/0262063 A1 | 9/2017 | Blenessy et al. | |
| 2017/0278304 A1 | 9/2017 | Hildreth et al. | |
| 2017/0287225 A1 | 10/2017 | Powderly et al. | |
| 2017/0296363 A1 | 10/2017 | Yetkin et al. | |
| 2017/0364198 A1 | 12/2017 | Yoganandan et al. | |
| 2017/0372499 A1 | 12/2017 | Lalonde | |
| 2018/0005443 A1 | 1/2018 | Poulos et al. | |
| 2018/0024623 A1 | 1/2018 | Faaborg et al. | |
| 2018/0059901 A1 | 3/2018 | Gullicksen | |
| 2018/0095635 A1* | 4/2018 | Valdivia | G06F 3/0482 |
| 2018/0107278 A1 | 4/2018 | Goel et al. | |
| 2018/0113599 A1 | 4/2018 | Yin | |
| 2018/0144556 A1 | 5/2018 | Champion et al. | |
| 2018/0307303 A1 | 10/2018 | Powderly et al. | |
| 2018/0322701 A1 | 11/2018 | Pahud et al. | |
| 2018/0335925 A1 | 11/2018 | Hsiao et al. | |
| 2018/0349690 A1 | 12/2018 | Rhee et al. | |
| 2018/0357780 A1 | 12/2018 | Young et al. | |
| 2019/0033989 A1 | 1/2019 | Wang et al. | |
| 2019/0094981 A1 | 3/2019 | Bradski et al. | |
| 2019/0102941 A1 | 4/2019 | Khan et al. | |
| 2019/0107894 A1 | 4/2019 | Hebbalaguppe et al. | |
| 2019/0130655 A1 | 5/2019 | Gupta et al. | |
| 2019/0188895 A1 | 6/2019 | Miller, IV et al. | |
| 2019/0213792 A1 | 7/2019 | Jakubzak et al. | |
| 2019/0258318 A1 | 8/2019 | Qin et al. | |
| 2019/0278376 A1 | 9/2019 | Kutliroff et al. | |
| 2019/0279424 A1 | 9/2019 | Clausen et al. | |
| 2019/0286231 A1 | 9/2019 | Burns et al. | |
| 2019/0310757 A1 | 10/2019 | Lee et al. | |
| 2019/0355272 A1 | 11/2019 | Nusbaum et al. | |
| 2019/0362557 A1 | 11/2019 | Lacey et al. | |
| 2019/0362562 A1 | 11/2019 | Benson | |
| 2019/0369391 A1 | 12/2019 | Cordesses et al. | |
| 2019/0377416 A1 | 12/2019 | Alexander | |
| 2020/0033957 A1 | 1/2020 | Bieglmayer | |
| 2020/0064908 A1 | 2/2020 | Boucher | |
| 2020/0082629 A1 | 3/2020 | Jones et al. | |
| 2020/0097077 A1 | 3/2020 | Nguyen et al. | |
| 2020/0097091 A1 | 3/2020 | Chou et al. | |
| 2020/0103521 A1 | 4/2020 | Chiarella et al. | |
| 2020/0134895 A1 | 4/2020 | Pollard et al. | |
| 2020/0143598 A1 | 5/2020 | Riordan | |
| 2020/0218423 A1 | 7/2020 | Ohashi | |
| 2020/0225736 A1 | 7/2020 | Schwarz et al. | |
| 2020/0225758 A1 | 7/2020 | Tang et al. | |
| 2020/0226814 A1 | 7/2020 | Tang et al. | |
| 2020/0241646 A1 | 7/2020 | Hebbalaguppe et al. | |
| 2020/0249746 A1 | 8/2020 | Gkaintatzis | |

(56) References Cited

U.S. PATENT DOCUMENTS

2020/0272231 A1* 8/2020 Klein .................. G06F 3/011
2021/0012113 A1 1/2021 Petill et al.

OTHER PUBLICATIONS

Schweigert, R. et al. "EyePointing: A gaze-based selection technique." Proceedings of Mensch and Computer, Sep. 8, 2019, pp. 719-723.

Mayer, S. et al. "The effect of offset correction and cursor on mid-air pointing in real and virtual environments." Proceedings of the 2018 CHI Conference on Human Factors in Computing Systems, Apr. 2018, pp. 1-13.

"Unity Gets Toolkit for Common AR/VR interactions" [accessed Apr. 7, 2020]. Unity XR Interaction Toolkit Preview Dec. m, 2019.

Katz, "Extending Web Browsers with a Unity 3D-Based Virtual Worlds Viewer", 2011, IEEE Computer Society, pp. 15-21 (Year: 2011).

Olwal, A. et al. "The Flexible Pointer: An Interaction Technique for Selection in Augmented and Virtual Reality," Proceedings of ACM Symposium on User Interface Software and Technology (UIST), pp. 81-82, publication date Nov. 5, 2003.

Qiao et al. "Web AR: A Promising Future for Mobile Augmented Reality—State of the Art, Challenges, and Insights," Apr. 2019, vol. 107, No. 4 IEEE, pp. 651-666.

Renner, P. et al. "Ray Casting". [accessed Apr. 7, 2020], 2 pages.

Srinivasa, et al. "Augmented Reality Adaptive Web Content," IEEE Annual Consumer Communications & Networking Conference (CCNC) 2016, pp. 1-4.

* cited by examiner

US 11,178,376 B1

METERING FOR DISPLAY MODES IN ARTIFICIAL REALITY

TECHNICAL FIELD

The present disclosure is directed to setting display modes for virtual objects, in an artificial reality environment, based on a display mode timer.

BACKGROUND

In an artificial reality environment, some or all of the objects a user sees and interacts with are "virtual objects," i.e., representations of objects generated by a computing system that appear in an environment. Virtual objects in an artificial reality environment can be presented to the user by a head-mounted display, a mobile device, a projection system, or another computing system. Often, users can interact with virtual objects using controllers and/or gestures. For example, user "interactions" with virtual objects can include selecting, moving, rotating, resizing, actuating controls, changing colors or skins, defining interactions between real or virtual objects, setting virtual forces to act on virtual objects, or any other action on or change to an object that a user can imagine. Virtual objects can be 3D models, 2D panels, representations of user avatars, interfaces to control applications, collections of other virtual objects, etc. In some systems, a user can also interact with "real objects" that exist independent of the computer system that is controlling the artificial reality environment. For example, a user can select a real object and add a virtual overlay to change the object's color or some other way the object is presented to the user, cause the real object to affect other virtual objects, etc. As used herein, unless otherwise specified, an "object" can be a real or virtual object.

Virtual objects in an artificial reality environment can have various display properties such as size, shape, opacity, coloring, etc., which can be set when the object is created. In some cases, these display properties can change during the life of the object. However, such changes can be disorienting to a user when they are unexpected or performed for a virtual object on which a user is currently focused.

BRIEF DESCRIPTION OF THE DRAWINGS

The techniques introduced here may be better understood by referring to the following Detailed Description in conjunction with the accompanying drawings, in which like reference numerals indicate identical or functionally similar elements.

DETAILED DESCRIPTION

Figure 1:
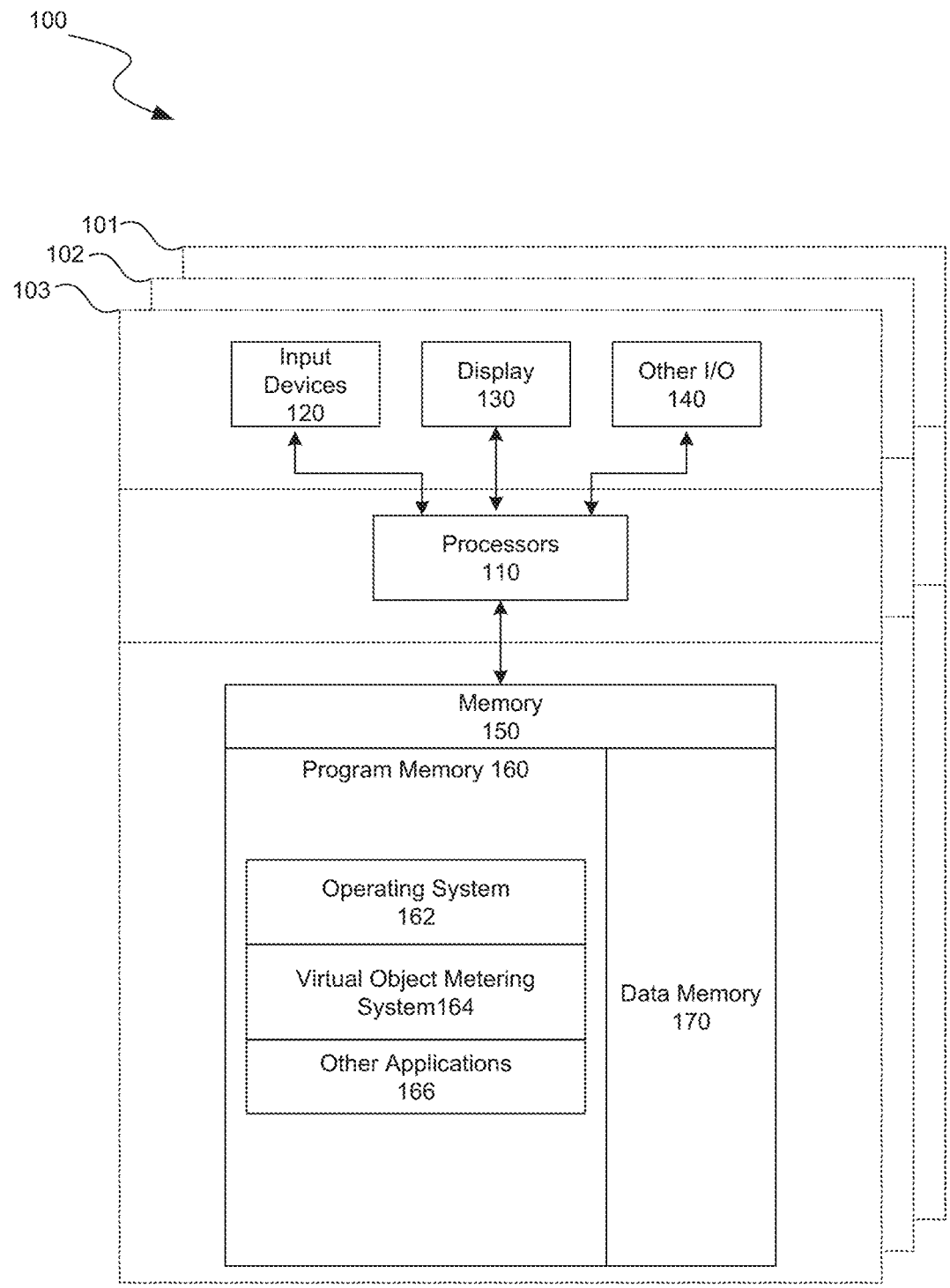
FIG. 1 is a block diagram illustrating an overview of devices on which some implementations of the present technology can operate.

Aspects of the present disclosure are directed to setting a display mode for a virtual object based on a display mode timer that is controlled by context factors. When an artificial reality system presents virtual objects in an artificial reality environment, if the objects are always in a fully maximized display mode, they can overwhelm the user's field of view (FOV) and can consume significant power and processing resources. However, requiring manual actions to transition virtual objects to a minimized display mode would be frustrating and overly time-consuming for users. Instead, an artificial reality system configured in accordance with the present technology can associate one or more virtual objects with a corresponding display mode timer. Various ranges on the display mode timer can be mapped to different display modes that the virtual object can assume. For example, a display mode timer for a virtual object containing models for a geographical mapping application can be initially set to 30 seconds with ranges 15-30 seconds corresponding to a display mode that displays all the models, 5-14 seconds corresponding to a minimized mode which reduces the size of the models and removes models providing details, and 0-4 seconds corresponding to a "glint" mode which only shows a small icon for the mapping application. In various implementations, display mode timers can all have the same range mappings or different display mode timers can have different range mappings.

In some cases, the display mode timer can be adjusted to add time based on a determination of a user focusing on the corresponding virtual object. In various implementations, this focus can be identified based on a determined gaze of the user being directed at the virtual object, the user providing input (e.g., a selection gesture, a voice command, etc.) in relation to the virtual object, the user moving to within a threshold distance, in the artificial reality environment, of the virtual object, etc. Such a determination of user focus is one type of context factor that an artificial reality system can monitor. In some implementations, additional or other types of context factors can be the basis for adding or removing time from a display mode timer. For example, time can be added to a display mode timer when data is provided in relation to the corresponding virtual object, when that virtual object is providing "active output" (i.e., playing music or a video, displaying live data, providing a notification, or otherwise providing output of a type defined for preventing a change in display modes), or when the artificial reality system changes to a different state (e.g., from power saving mode to normal mode). In addition to an amount of time on a display mode timer, display mode timers can have other properties such as a maximum amount of time or how quickly the display mode timer runs down. While display mode timers are referred to herein as having "time," a countdown speed property of a display mode timer can decrement that allocated time faster or slower than a normal clock. For example, a countdown speed of a display mode timer can cause the time to run out more quickly when a virtual object is not displayed relative to a user, based on how much display space (and therefore power) a virtual object is taking (e.g., in relation to various thresholds), when an artificial reality system is in power saving mode, when a virtual object is further away (above a threshold amount) from a user, etc.

When the time remaining on a display mode timer crosses a boundary to a range corresponding to a new display mode, the corresponding virtual object can be triggered to enable the new display mode. In some implementations, certain display mode timer ranges can specify constraints defining how the virtual object can write to the display (e.g., how much of the display it can use, where it can be placed, how often it can wake up, etc.).

In some implementations, display modes or constraints can apply to only some aspects of a virtual object. For example, display modes or constraints can control visual or audio output separately. In some cases, once a virtual object has reached a certain display mode, such as a glint mode, it may take a specified user action (e.g., a particular gesture) to add time back onto the corresponding display mode timer. In some implementations, virtual objects may be grouped (e.g., based on type of data they work on, user grouping selections, etc.) so that they share a display mode timer or so that the display mode timers assigned to them are synchronized.

Embodiments of the disclosed technology may include or be implemented in conjunction with an artificial reality system. Artificial reality or extra reality (XR) is a form of reality that has been adjusted in some manner before presentation to a user, which may include, e.g., virtual reality (VR), augmented reality (AR), mixed reality (MR), hybrid reality, or some combination and/or derivatives thereof. Artificial reality content may include completely generated content or generated content combined with captured content (e.g., real-world photographs). The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, a "cave" environment or other projection system, or any other hardware platform capable of providing artificial reality content to one or more viewers.

"Virtual reality" or "VR," as used herein, refers to an immersive experience where a user's visual input is controlled by a computing system. "Augmented reality" or "AR" refers to systems where a user views images of the real world after they have passed through a computing system. For example, a tablet with a camera on the back can capture images of the real world and then display the images on the screen on the opposite side of the tablet from the camera. The tablet can process and adjust or "augment" the images as they pass through the system, such as by adding virtual objects. "Mixed reality" or "MR" refers to systems where light entering a user's eye is partially generated by a computing system and partially composes light reflected off objects in the real world. For example, a MR headset could be shaped as a pair of glasses with a pass-through display, which allows light from the real world to pass through a waveguide that simultaneously emits light from a projector in the MR headset, allowing the MR headset to present virtual objects intermixed with the real objects the user can see. "Artificial reality," "extra reality," or "XR," as used herein, refers to any of VR, AR, MR, or any combination or hybrid thereof.

Existing artificial reality systems either fail to provide virtual objects that have varying display modes or only provide display mode transitions that require excessive user instruction and/or are disruptive to user experiences. An artificial reality system that presents virtual objects in a single display mode can cause the virtual objects to overwhelm the user's field of view, while also consuming significant power and processing resources. Further, artificial reality systems that require manual user actions to transition virtual objects between display modes are frustrating and overly time consuming for users. Yet other artificial reality systems that may have rules for transitioning between display modes fail to implement them in a manner that users find intuitive, which can cause frustration when a virtual object unexpectedly minimizes and/or wastes power when a display renders a virtual object the user is not focused on.

The artificial reality system and processes described herein are expected to overcome these problems associated with existing artificial reality systems by 1) decreasing cognitive load on users by generally not requiring manual virtual object minimizations; 2) increasing system usability by reserving the user's FOV for virtual objects that the user is interested in; and 3) saving power and processing resources by reducing the amount of display space and rendering used by virtual objects that are not of interest to the user. Each of these benefits can be achieved by applying a display mode timer to virtual objects, where ranges of the display mode timer are mapped to display modes and time and can be added to the display mode timer based on user focus and/or other context factors. Further, the systems and processes described herein are rooted in computerized artificial reality systems, instead of being an analog of traditional content interactions. For example, when displaying content, existing computing systems may resize and change styles to fit the content to the viewing area (e.g., reactive display in a website) but do not change and update display modes based on timers controlled by user focus.

Several implementations are discussed below in more detail in reference to the figures. FIG. 1 is a block diagram illustrating an overview of devices on which some implementations of the disclosed technology can operate. The devices can comprise hardware components of a computing system 100 that assigns display mode timers, that are based on context factors such as user focus, to virtual objects to control when the virtual objects transition between display modes. In various implementations, computing system 100 can include a single computing device 103 or multiple computing devices (e.g., computing device 101, computing device 102, and computing device 103) that communicate over wired or wireless channels to distribute processing and share input data. In some implementations, computing system 100 can include a stand-alone headset capable of providing a computer created or augmented experience for a user without the need for external processing or sensors. In other implementations, computing system 100 can include multiple computing devices such as a headset and a core processing component (such as a console, mobile device, or server system) where some processing operations are performed on the headset and others are offloaded to the core processing component. Example headsets are described below in relation to FIGS. 2A and 2B. In some implementations, position and environment data can be gathered only by sensors incorporated in the headset device, while in other implementations one or more of the non-headset computing devices can include sensor components that can track environment or position data.

Computing system 100 can include one or more processor(s) 110 (e.g., central processing units (CPUs), graphical processing units (GPUs), holographic processing units (HPUs), etc.) Processors 110 can be a single processing unit or multiple processing units in a device or distributed across multiple devices (e.g., distributed across two or more of computing devices 101-103).

Computing system 100 can include one or more input devices 120 that provide input to the processors 110, notifying them of actions. The actions can be mediated by a hardware controller that interprets the signals received from the input device and communicates the information to the processors 110 using a communication protocol. Each input device 120 can include, for example, a mouse, a keyboard, a touchscreen, a touchpad, a wearable input device (e.g., a haptics glove, a bracelet, a ring, an earring, a necklace, a watch, etc.), a camera (or other light-based input device, e.g., an infrared sensor), a microphone, or other user input devices.

Processors 110 can be coupled to other hardware devices, for example, with the use of an internal or external bus, such as a PCI bus, SCSI bus, or wireless connection. The processors 110 can communicate with a hardware controller for devices, such as for a display 130. Display 130 can be used to display text and graphics. In some implementations, display 130 includes the input device as part of the display, such as when the input device is a touchscreen or is equipped with an eye direction monitoring system. In some implementations, the display is separate from the input device. Examples of display devices are: an LCD display screen, an LED display screen, a projected, holographic, or augmented reality display (such as a heads-up display device or a head-mounted device), and so on. Other I/O devices 140 can also be coupled to the processor, such as a network chip or card, video chip or card, audio chip or card, USB, firewire or other external device, camera, printer, speakers, CD-ROM drive, DVD drive, disk drive, etc.

Computing system 100 can include a communication device capable of communicating wirelessly or wire-based with other local computing devices or a network node. The communication device can communicate with another device or a server through a network using, for example, TCP/IP protocols. Computing system 100 can utilize the communication device to distribute operations across multiple network devices.

The processors 110 can have access to a memory 150, which can be contained on one of the computing devices of computing system 100 or can be distributed across of the multiple computing devices of computing system 100 or other external devices. A memory includes one or more hardware devices for volatile or non-volatile storage, and can include both read-only and writable memory. For example, a memory can include one or more of random access memory (RAM), various caches, CPU registers, read-only memory (ROM), and writable non-volatile memory, such as flash memory, hard drives, floppy disks, CDs, DVDs, magnetic storage devices, tape drives, and so forth. A memory is not a propagating signal divorced from underlying hardware; a memory is thus non-transitory. Memory 150 can include program memory 160 that stores programs and software, such as an operating system 162, virtual object metering system 164, and other application programs 166. Memory 150 can also include data memory 170 that can, for example, include display mode timer properties, configurations, or data structures; context factor values; data structures for virtual objects (or clusters of virtual objects); artificial reality system modes or settings; a registry of which virtual objects to provide with which context factors; user options; settings; preferences; etc., which can be provided to the program memory 160 or any element of the computing system 100.

Some implementations can be operational with numerous other computing system environments or configurations. Examples of computing systems, environments, and/or configurations that may be suitable for use with the technology include, but are not limited to, XR headsets, personal computers, server computers, handheld or laptop devices, cellular telephones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 2A:
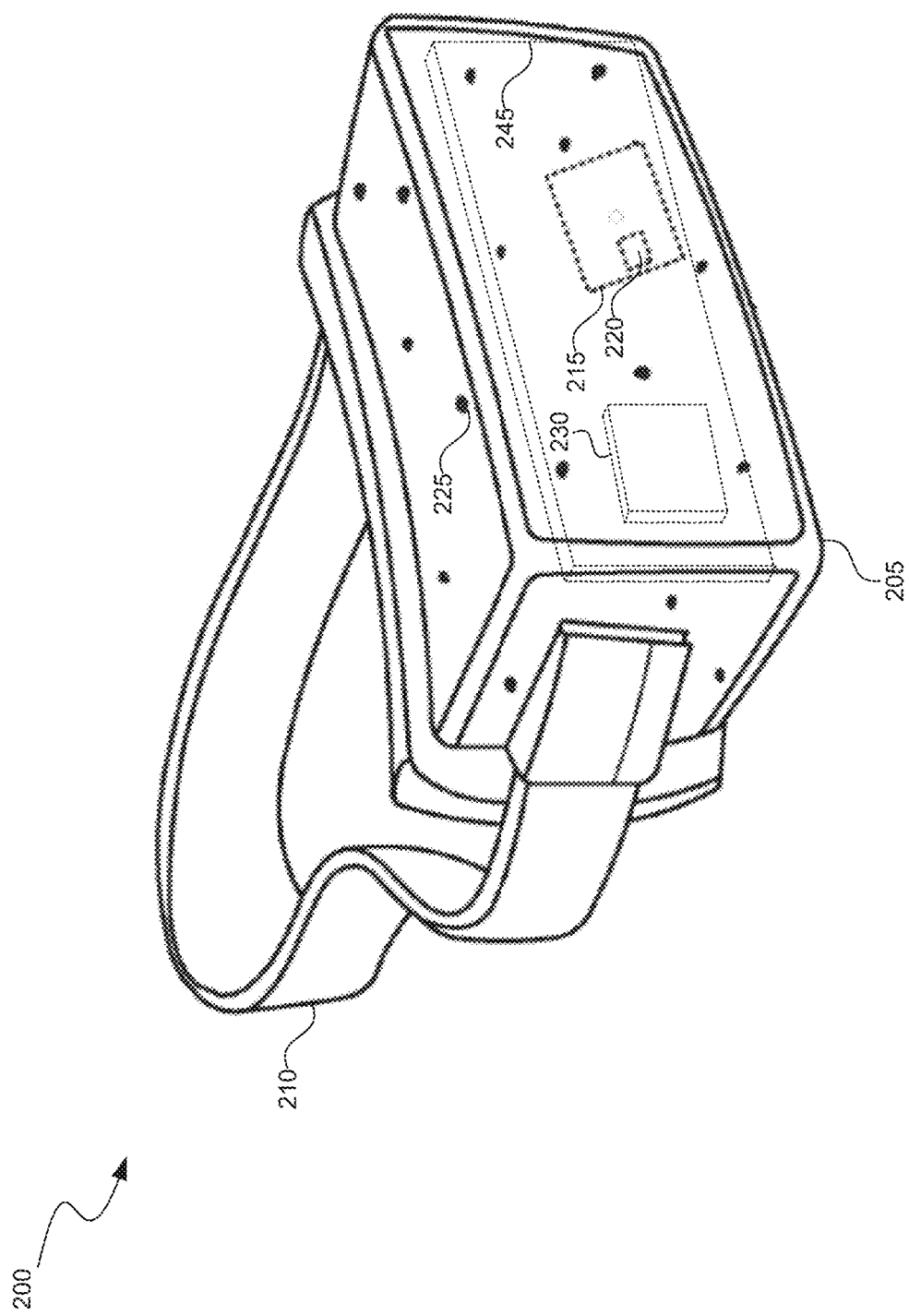
FIG. 2A is a wire diagram illustrating a virtual reality headset which can be used in some implementations of the present technology.

FIG. 2A is a wire diagram of a virtual reality head-mounted display (HMD) 200, in accordance with some embodiments. The HMD 200 includes a front rigid body 205 and a band 210. The front rigid body 205 includes one or more electronic display elements of an electronic display 245, an inertial motion unit (IMU) 215, one or more position sensors 220, locators 225, and one or more compute units 230. The position sensors 220, the IMU 215, and compute units 230 may be internal to the HMD 200 and may not be visible to the user. In various implementations, the IMU 215, position sensors 220, and locators 225 can track movement and location of the HMD 200 in the real world and in a virtual environment in three degrees of freedom (3DoF) or six degrees of freedom (6DoF). For example, the locators 225 can emit infrared light beams which create light points on real objects around the HMD 200. As another example, the IMU 215 can include e.g., one or more accelerometers, gyroscopes, magnetometers, other non-camera-based position, force, or orientation sensors, or combinations thereof. One or more cameras (not shown) integrated with the HMD 200 can detect the light points. Compute units 230 in the HMD 200 can use the detected light points to extrapolate position and movement of the HMD 200 as well as to identify the shape and position of the real objects surrounding the HMD 200.

The electronic display 245 can be integrated with the front rigid body 205 and can provide image light to a user as dictated by the compute units 230. In various embodiments, the electronic display 245 can be a single electronic display or multiple electronic displays (e.g., a display for each user eye). Examples of the electronic display 245 include: a liquid crystal display (LCD), an organic light-emitting diode (OLED) display, an active-matrix organic light-emitting diode display (AMOLED), a display including one or more quantum dot light-emitting diode (QOLED) sub-pixels, a projector unit (e.g., microLED, LASER, etc.), some other display, or some combination thereof.

In some implementations, the HMD 200 can be coupled to a core processing component such as a personal computer (PC) (not shown) and/or one or more external sensors (not shown). The external sensors can monitor the HMD 200 (e.g., via light emitted from the HMD 200) which the PC can use, in combination with output from the IMU 215 and position sensors 220, to determine the location and movement of the HMD 200.

In some implementations, the HMD 200 can be in communication with one or more other external devices, such as controllers (not shown) which a user can hold in one or both hands. The controllers can have their own IMU units, position sensors, and/or can emit further light points. The HMD 200 or external sensors can track these controller light points. The compute units 230 in the HMD 200 or the core processing component can use this tracking, in combination with IMU and position output, to monitor hand positions and motions of the user. The controllers can also include various buttons a user can actuate to provide input and interact with virtual objects. In various implementations, the HMD 200 can also include additional subsystems, such as an eye tracking unit, an audio system, various network components, etc. In some implementations, instead of or in addition to controllers, one or more cameras included in the HMD 200 or external to it can monitor the positions and poses of the user's hands to determine gestures and other hand and body motions.

Figure 2B:
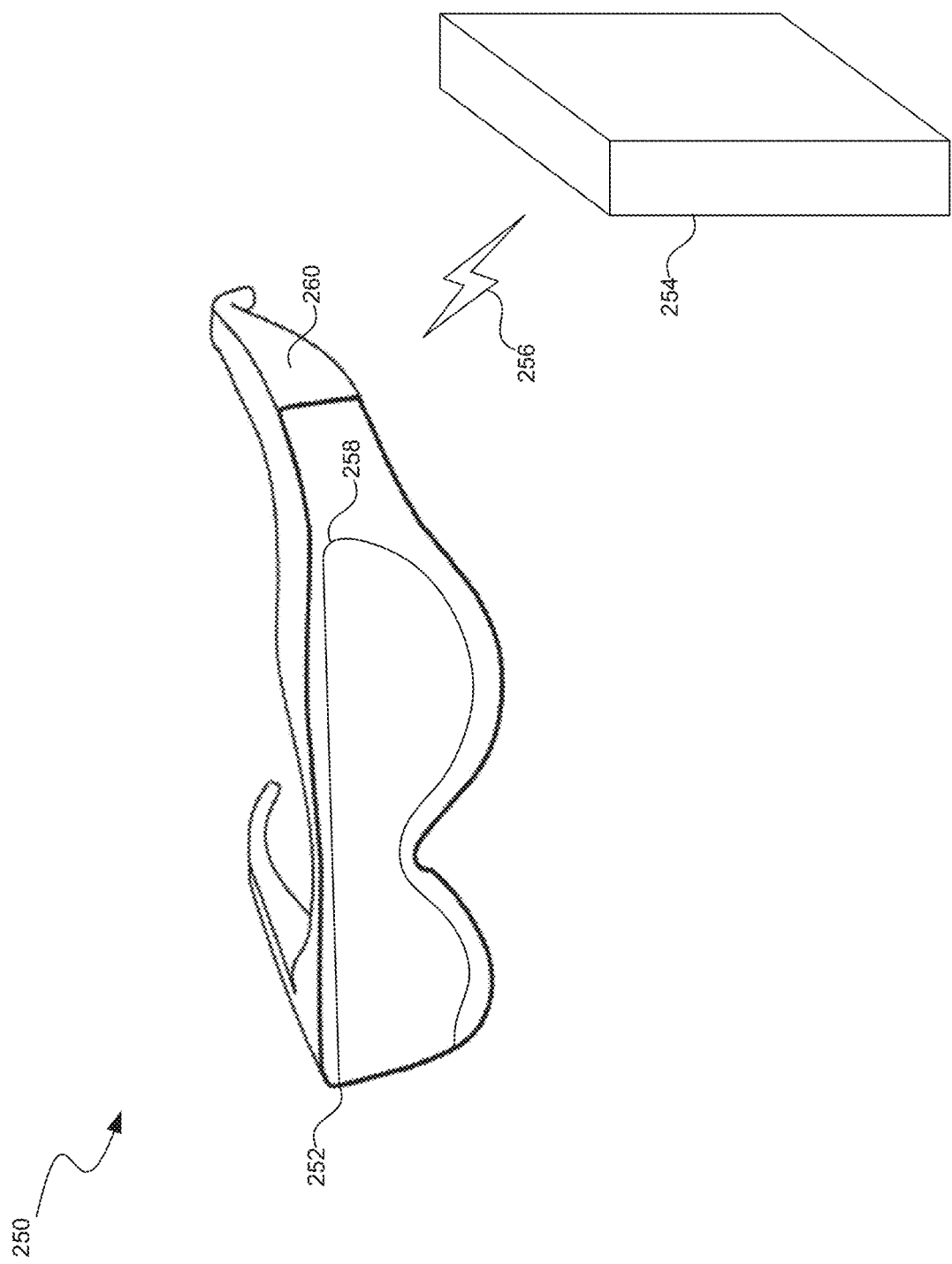
FIG. 2B is a wire diagram illustrating a mixed reality headset which can be used in some implementations of the present technology.

FIG. 2B is a wire diagram of a mixed reality HMD system 250 which includes a mixed reality HMD 252 and a core processing component 254. The mixed reality HMD 252 and the core processing component 254 can communicate via a wireless connection (e.g., a 60 GHz link) as indicated by link 256. In other implementations, the mixed reality system 250 includes a headset only, without an external compute device or includes other wired or wireless connections between the mixed reality HMD 252 and the core processing component 254. The mixed reality HMD 252 includes a pass-through display 258 and a frame 260. The frame 260 can house various electronic components (not shown) such as light projectors (e.g., LASERs, LEDs, etc.), cameras, eye-tracking sensors, MEMS components, networking components, etc.

The projectors can be coupled to the pass-through display 258, e.g., via optical elements, to display media to a user. The optical elements can include one or more waveguide assemblies, reflectors, lenses, mirrors, collimators, gratings, etc., for directing light from the projectors to a user's eye. Image data can be transmitted from the core processing component 254 via link 256 to HMD 252. Controllers in the HMD 252 can convert the image data into light pulses from the projectors, which can be transmitted via the optical elements as output light to the user's eye. The output light can mix with light that passes through the display 258, allowing the output light to present virtual objects that appear as if they exist in the real world.

Similarly to the HMD 200, the HMD system 250 can also include motion and position tracking units, cameras, light sources, etc., which allow the HMD system 250 to, e.g., track itself in 3DoF or 6DoF, track portions of the user (e.g., hands, feet, head, or other body parts), map virtual objects to appear as stationary as the HMD 252 moves, and have virtual objects react to gestures and other real-world objects.

Figure 3:
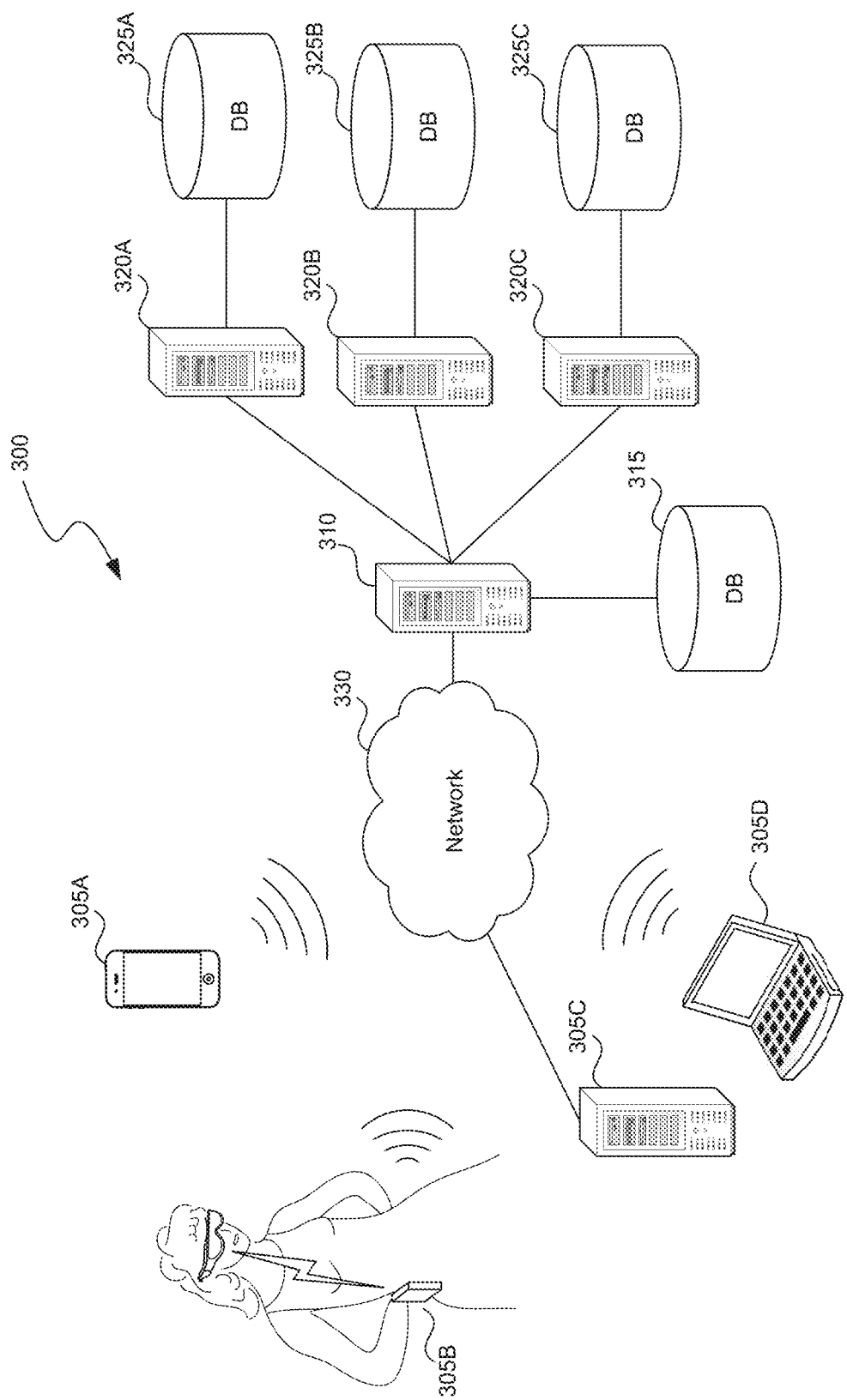
FIG. 3 is a block diagram illustrating an overview of an environment in which some implementations of the present technology can operate.

FIG. 3 is a block diagram illustrating an overview of an environment 300 in which some implementations of the disclosed technology can operate. Environment 300 can include one or more client computing devices 305A-D, examples of which can include computing system 100. In some implementations, some of the client computing devices (e.g., client computing device 305B) can be the HMD 200 or the HMD system 250. Client computing devices 305 can operate in a networked environment using logical connections through network 330 to one or more remote computers, such as a server computing device.

In some implementations, server 310 can be an edge server which receives client requests and coordinates fulfillment of those requests through other servers, such as servers 320A-C. Server computing devices 310 and 320 can comprise computing systems, such as computing system 100. Though each server computing device 310 and 320 is displayed logically as a single server, server computing devices can each be a distributed computing environment encompassing multiple computing devices located at the same or at geographically disparate physical locations.

Client computing devices 305 and server computing devices 310 and 320 can each act as a server or client to other server/client device(s). Server 310 can connect to a database 315. Servers 320A-C can each connect to a corresponding database 325A-C. As discussed above, each server 310 or 320 can correspond to a group of servers, and each of these servers can share a database or can have their own database. Though databases 315 and 325 are displayed logically as single units, databases 315 and 325 can each be a distributed computing environment encompassing multiple computing devices, can be located within their corresponding server, or can be located at the same or at geographically disparate physical locations.

Network 330 can be a local area network (LAN), a wide area network (WAN), a mesh network, a hybrid network, or other wired or wireless networks. Network 330 may be the Internet or some other public or private network. Client computing devices 305 can be connected to network 330 through a network interface, such as by wired or wireless communication. While the connections between server 310 and servers 320 are shown as separate connections, these connections can be any kind of local, wide area, wired, or wireless network, including network 330 or a separate public or private network.

Figure 4:
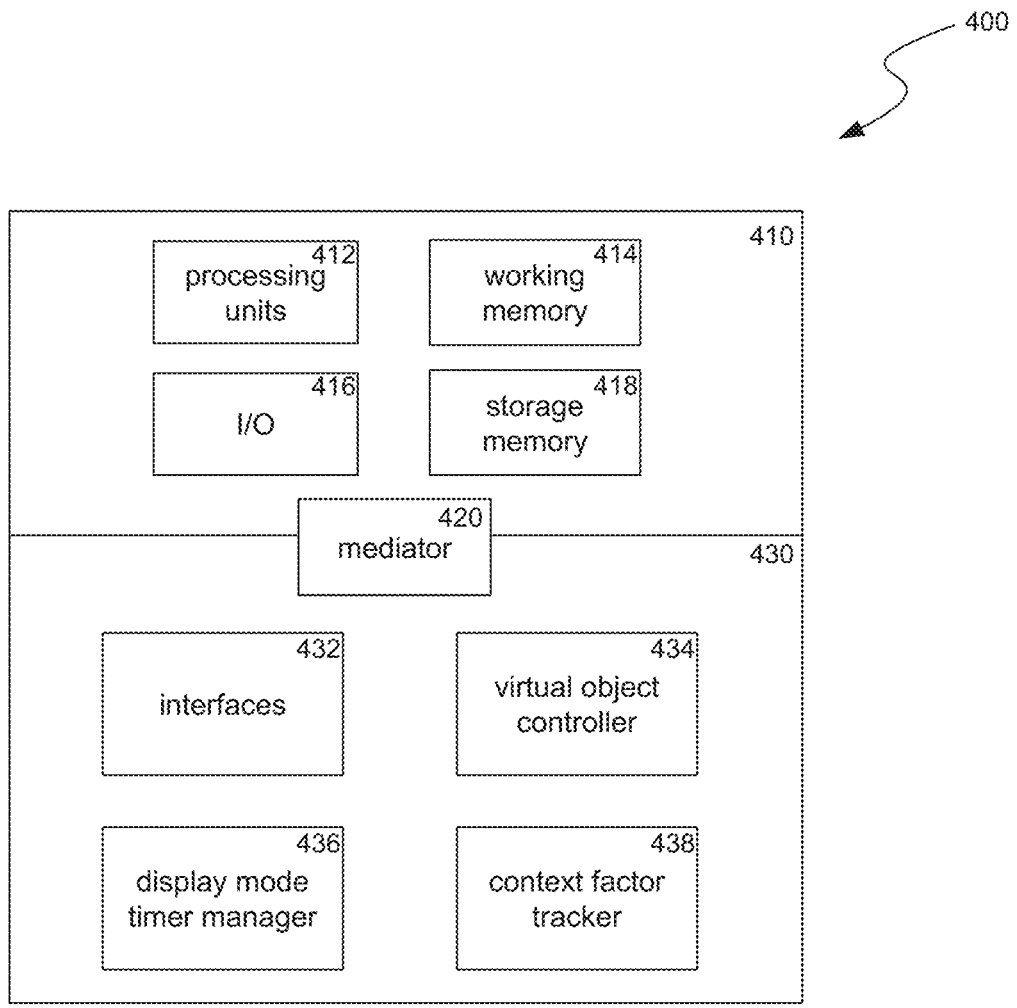
FIG. 4 is a block diagram illustrating components which, in some implementations, can be used in a system employing the disclosed technology.

FIG. 4 is a block diagram illustrating components 400 which, in some implementations, can be used in a system employing the disclosed technology. Components 400 can be included in one device of computing system 100 or can be distributed across multiple of the devices of computing system 100. The components 400 include hardware 410, mediator 420, and specialized components 430. As discussed above, a system implementing the disclosed technology can use various hardware including processing units 412, working memory 414, input and output devices 416 (e.g., cameras, displays, IMU units, network connections, etc.), and storage memory 418. In various implementations, storage memory 418 can be one or more of: local devices, interfaces to remote storage devices, or combinations thereof. For example, storage memory 418 can be one or more hard drives or flash drives accessible through a system bus or can be a cloud storage provider (such as in storage 315 or 325) or other network storage accessible via one or more communications networks. In various implementations, components 400 can be implemented in a client computing device such as client computing devices 305 or on a server computing device, such as server computing device 310 or 320.

Mediator 420 can include components which mediate resources between hardware 410 and specialized components 430. For example, mediator 420 can include an operating system, services, drivers, a basic input output system (BIOS), controller circuits, or other hardware or software systems.

Specialized components 430 can include software or hardware configured to perform operations for assigning and administering display mode timers for virtual objects. Specialized components 430 can include virtual object controller 434, display mode timer manager 436, context factor tractor 438, and components and APIs which can be used for providing user interfaces, transferring data, and controlling the specialized components, such as interfaces 432. In some implementations, components 400 can be in a computing system that is distributed across multiple computing devices or can be an interface to a server-based application executing one or more of specialized components 430. Although depicted as separate components, specialized components 430 may be logical or other nonphysical differentiations of functions and/or may be submodules or code-blocks of one or more applications.

Virtual object controller 434 can receive requests for new virtual objects. In some cases, a request can be associated with mappings of display modes to display mode timer ranges and/or other rules for setting display mode timer properties. The virtual object controller 434 can create the requested object and respond to the request with access to the new virtual object. In some implementations, the virtual object can be associated with a display mode timer created by display mode timer manager 436. Virtual object controller 434 can also enforce constraints for the virtual objects, ensuring they conform to the constraints (e.g., size, shape, etc.) when certain display modes are enabled. Additional details on creating and controlling virtual objects are discussed below in relation to blocks 502 and 514 of FIG. 5 and block 608 of FIG. 6.

Display mode timer manager 436 can set up display mode timers for virtual objects created by virtual object controller 434. Display mode timer manager 436 can also receive values for context factors (from context factor tracker 438) and apply them to rules for the display mode timer. In some implementations, this can be performed by a version of display mode timer manager 436 controlled by the virtual object. In response to evaluating the rules based on the context factor values, the display mode timer manager 436 can add or remove time from the display mode timer or change display mode timer properties (e.g., countdown speed, range to display mode mappings, maximum time, etc.) As time elapses, the display mode timer manager 436 can also decrement the time on a display mode timer. Additional details on creating and controlling display mode timers are discussed below in relation to blocks 510-512 of FIG. 5 and 602-606 of FIG. 6.

Context factor tractor 438 can maintain a registry of which display mode timers should receive which context factors. In some cases, context factor tractor 438 can accomplish this by analyzing the rules set for each display mode timer to determine which context factors are used by the rules for that display mode timer. In other cases, all display mode timers have the same rules, allowing for a pre-specified set of context factors that are provided to all display mode timers. Context factor tractor 438 can also monitor for context factors values being set or changed by a threshold amount and, when this occurs, can use the registry to provide the values for those context factors to the display mode timers registered to receive them. Additional details on registering display mode timers for context factors and providing context factor values to the display mode timers are discussed below in relation to blocks 504 and 506 of FIG. 5.

Those skilled in the art will appreciate that the components illustrated in FIGS. 1-4 described above, and in each of the flow diagrams discussed below, may be altered in a variety of ways. For example, the order of the logic may be rearranged, substeps may be performed in parallel, illustrated logic may be omitted, other logic may be included, etc. In some implementations, one or more of the components described above can execute one or more of the processes described below.

Figure 5:
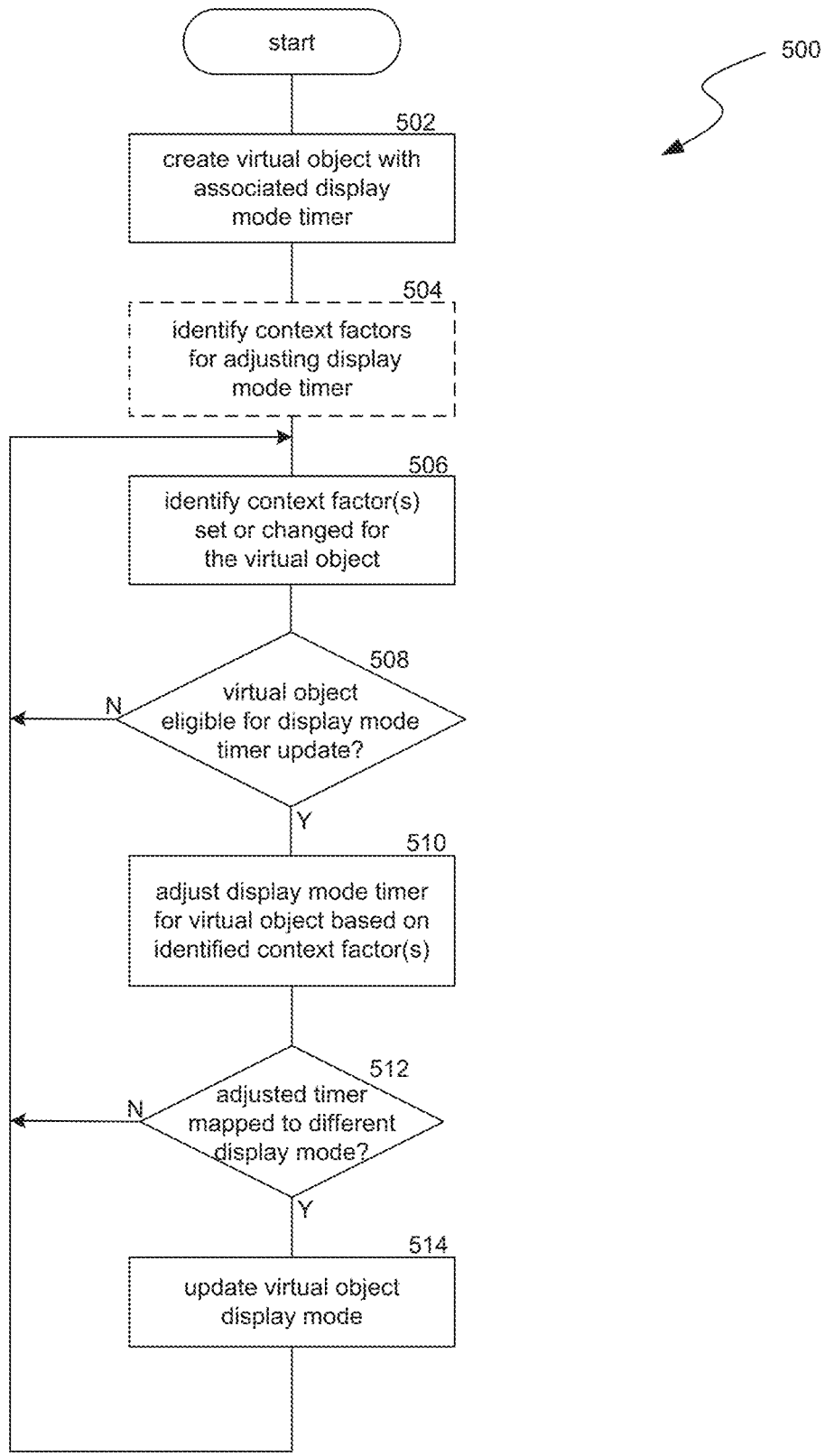
FIG. 5 is a flow diagram illustrating a process used in some implementations of the present technology for creating a virtual object with a display mode timer and adjusting the display mode timer in response to context factors.

FIG. 5 is a flow diagram illustrating a process 500 used in some implementations of the present technology for creating a virtual object with a display mode timer and adjusting the display mode timer in response to context factors. In some implementations, process 500 can begin when a new virtual object is created. In some cases, all virtual objects receive display mode timers causing an execution of process 500 for each. In other cases, only virtual objects of certain types, created by certain applications, or when requested with certain parameters (e.g., a display mode timer parameter) are assigned a display mode timer, causing a corresponding execution of process 500. In some implementations, process 500 can be executed by part of a controller (i.e., a "shell") for the artificial reality environment that can control how artificial reality environment information and objects appear to users, what interactions can be performed, and what interactions are provided to applications. In some implementations, portions of process 500 can be performed by the shell while other portions are controlled by the virtual object or an application in control of the virtual object. For example, in some implementations, each display mode timer is controlled by a corresponding virtual object or the application that controls that corresponding virtual object, so blocks 502-506 can be performed by the shell while blocks 508-514 are performed by the virtual object or virtual object controlling application. In other implementations, the display mode timers are controlled by the shell, so blocks 502-512 can be performed by the shell while block 514 is performed by the virtual object or virtual object controlling application. Other implementations can divide process 500 differently or parts can be performed by other entities.

At block 502, process 500 can create a virtual object with an associated display mode timer. In some cases, the virtual object can be created in response to a new object request. Such virtual objects can be wholly virtual objects or additions for real-world objects, such as an effect applied to a person or thing. The display mode timer associated with a created virtual object can have properties such as a countdown speed, a mapping of time ranges to display modes, an initial amount of time on the display mode timer, a maximum amount of time the display mode timer can have, or rules specifying what context factors cause these properties to change and how. In various cases, the request for a new object can specify one or more of the display mode timer properties, the created virtual object can have a specified type that is associated with default display mode timer properties for that type, and/or all virtual objects can have some default display mode timer properties.

In various implementations, the display modes mapped to time ranges of a display mode timer can be custom for a particular virtual object or can be set the same for all virtual objects. In some cases, a combination of custom and default display mode mappings can be used, e.g., where the system specifies certain display modes that each virtual object must have, but the virtual object request can define the ranges for those display modes and/or can define additional display modes with further ranges. In various implementations, the display modes can include one or more of a maximized display mode, a minimized display mode, a glint display mode, a key-action display mode, a notifications-only display mode, and/or an audio-only display mode.

Each display mode can specify parameters for displaying objects in that mode, such as a maximum size for virtual objects, a percentage of the FOV a virtual object can take up, a percentage of the virtual object's full size that can be used while in that mode, a particular shape the virtual object can take in that mode, corresponding features the virtual object should display in that mode, how much processing power the virtual object can use (e.g., how often the virtual object can "wake up" and/or how much to throttle the processing threads allocated to a virtual object), and/or what the virtual object can display while in that mode. In some cases, when a virtual object is created, a request sent to the artificial reality system shell specifies characteristics of the virtual object display modes for the shell to approve when creating the volume. For example, a virtual object may be created by a request to the artificial reality system shell that allocates a volume for the virtual object.

The maximized display mode may allow a virtual object to be any size or to use the full amount of space allocated to it at creation. The minimized display mode can set a maximum size for a virtual object, reduce the size of the allocated virtual object volume by a percentage (e.g., 25%, 50%, or 75%), restrict the virtual object to a certain amount of the user's FOV (e.g., no more than 3%, 5%, or 10%), dim the virtual object or make it semi-transparent, or combinations thereof. The glint display mode can restrict the virtual object to a particular shape such as a "coin" shape with an icon, a 2D panel, or just a floating icon. A key-action display mode can show just certain controls for the virtual object. By way of example, a virtual object for a media player can just show the most often used media player controls, while a virtual object representing a person can just show controls for messaging that person and for tagging that person in a social media post. In some cases, the key-action display mode can be paired with another display mode, such as the glint display mode, such that the glint and the key actions are displayed together. In some implementations, the key-actions display mode can be triggered by a context factor other than the display mode timer, such as when the user's focus is directed to a virtual object in glint mode (see the example described below with reference to FIG. 7E). The notifications-only display mode can hide a virtual object until it has a notification event to display to the user. For example, a virtual object that presents a user interface (UI) for a messaging app can hide itself until a message comes in, at which point it can enter glint mode with an indication that there is a notification or a preview of the notification. In some cases, virtual objects in glint mode or in notification-only mode can be moved to a different location in the artificial reality environment, such as a docking surface to the side of the user's FOV or to a virtual object panel that the user can call up to reactivate virtual objects. In some implementations, display modes can individually control different types of virtual object output, such as visual output, audio output, haptic output, etc. For example, a display mode can be "audio-only" causing a virtual object to turn off all visual display while allowing audio output. As another example, a "conversation" display mode can mute all virtual object audio while a user is identified as having a conversation.

In some cases, the artificial reality system can impose constraints defining how a virtual object can write to the display when in particular display modes (e.g., how much of the display it can use, where it can be placed, how often it can wake up, etc.) In some cases, these constraints can be applied by verifying, at virtual object creation (e.g., by the shell), that the display modes defined for virtual objects conform to these maximums. This constraint system can be used where the virtual object and/or other virtual objects and applications that control the virtual object do not have access to later change these display mode parameters. In other cases, the shell can actively impose these constraints, e.g., by restricting the size or shape that a virtual object can use when the shell indicates the virtual object should enter a particular display mode.

In some implementations, virtual objects can be clustered (e.g., based on a type assigned to the virtual objects, a type of data the virtual objects work on, user selections of virtual object groupings, the virtual objects having a common creating entity, etc.). A cluster of virtual objects can share a display mode timer or can have their display mode timers synchronized. For example, when time is added to a display mode timer for one virtual object in a cluster in response to the user's focus being directed to that virtual object, time can be added to the other display mode timers for virtual objects in that cluster. In various implementations, the same amount of time can be added to each such display mode timer or different amounts can be added, e.g., by adding more time to the display mode timer for the virtual object that was the subject of the user focus.

While as discussed above, in various implementations, blocks of the processes described here can be removed or rearranged, block 504 is shown in broken lines to call out that block 504 may not be performed in some instances. For example, in some implementations, display mode timers can have a consistent set of rules for how context factors cause time to be added or removed and/or for changing display mode timer properties. In these cases, the relevant context factors to provide for adjusting a display mode timer are pre-determined so there is no need to identify such context factors at block 504. In other implementations, different display mode timers can have different such rules, and block 504 can be performed to identify which context factors should be provided to the display mode timer associated with the virtual object created at block 502. Process 500 can accomplish this by reviewing the rules established for the display mode timer when the associated virtual object was created at block 502 (e.g., specified in a shell request for the new virtual object) and identifying which context factors those rules rely upon. The identified context factors can be stored in a registry that maps context factors to virtual objects. In some implementations, the registry can specify a level of change in context factor values that must occur for that context factor to be provided to the display mode timer.

In other cases, such thresholds can be previously established for various context factors. For example, a context factor for ambient lighting can specify a threshold change in number of lumens that will cause the value for this context factor to be reported to display mode timers registered to receive it. In some implementations, the only context factor used to add time to a display mode timer is user focus.

At block 506, process 500 can identify context factor(s) that have been set or changed which should be reported to the virtual object created at block 502. In some implementations, identifying the context factors can be based on which context factors the display mode timer is registered, at block 504, to receive. In other implementations, identifying the context factors can be based on which context factors are pre-established to be provided to display mode timers or display mode timers of particular types. Identifying a context factor to provide to a display mode timer can include determining that a new value for a context factor has been set or that a new value for a context factor is a threshold amount different from a previous value set for that context factor. As discussed above, the registry can specify these thresholds for particular display mode timers, or such thresholds can be previously established for various context factors. In some implementations, instead of the shell pushing context factor values to display mode timers, the display mode timer can periodically pull the values for context factors it needs to update itself.

Examples of context factors that can be used to adjust display mode timer properties include indicators of user focus (e.g., user gaze direction, user proximity to the associated virtual object, an indication that the virtual object is in the user's FOV or is within a threshold distance from a center of the FOV, that a user has provided input to the virtual object e.g., through a gesture, a voice command, a controller selection, etc.); that an application associated with the virtual object is in a mode to keep itself awake (e.g., when playing music); when the virtual object receives an action (e.g., receives data or a notification from an external source); a current mode or state of the artificial reality system state (e.g., low power, active mode, movement below a threshold, etc.); or specifics of the virtual object such as power drain by that virtual object or whether the virtual object is providing active output (e.g., audio, video, displaying "live data" that is periodically retrieved from or kept synchronized with an external source). In some implementations, the rate at which the display mode timer counts down (i.e., a "countdown speed") is a property that can be adjusted. In various implementations, some of the context factors that can affect this property can include the following: whether the associated virtual object is positioned relative to the user (e.g., pinned to the user, on a surface that moves with the user, etc.) which can cause the countdown speed to decrease, whether the artificial reality system is in low power mode or whether the associated virtual object is determined to be drawing above a threshold amount of power which can cause the countdown speed to increase, whether a virtual object is under the control of certain applications or identified types of applications which can cause the countdown speed to decrease or increase depending on associated rules, or the countdown speed can be set proportional to the distance of the virtual object to the user in the artificial reality environment (e.g., the closer the virtual object is to the user, the slower the countdown speed).

At block 508, process 500 can determine whether the virtual object is eligible for a display mode timer update. For example, a display mode timer may be disabled when the associated virtual object is providing active output or otherwise in a keep-active mode. In some cases, a display mode timer may not be eligible to be updated when it has entered a particular display mode. For example, a display mode timer may not be eligible to have time added to it once it has entered glint mode until a particular user action has occurred (e.g., an explicit maximization of the virtual object). If the display mode timer for the virtual object is eligible for an update, process 500 can continue to block 510. Otherwise, process 500 can return to block 506.

At block 510, process 500 can adjust the display mode timer, for the virtual object created at block 502, based on the values for the context factors identified at block 506. Updating the display mode timer properties can be controlled by the rules specified for the display mode timer (e.g., specifically for the display mode timer, for display mode timers of a particular type, or for display mode timers generally). For example, a context factor with an indication that a user's focus was on the virtual object can add time to the display mode timer; the artificial reality system entering power saving mode can remove time from the display mode timer or can increase the display mode timer's countdown speed; the virtual object receiving a notification can add time to the display mode timer; the virtual object providing active output can add time to the display mode timer; the virtual object coming under the control of a high priority application can cause the maximum time for the display mode timer to be increased or can specify a new mapping of ranges of the display mode timer to display modes; etc. Many other rules can be specified that map context factor changes to changes in display mode timer properties.

At block 512, process 500 can determine whether the current state of the display mode timer, with the adjustments made at block 510, indicates the current amount of time on the display mode timer is mapped to a display mode other than a current display mode of the virtual object. If so, process 500 can proceed to block 514. Otherwise, process 500 can return to block 506.

At block 514, process 500 can cause the new display mode that corresponds to the current state of the display mode timer to be enabled. This can include indicating to the virtual object which display mode to enable. In some implementations, this can also include the artificial reality system shell enabling constraints corresponding to the new display mode, ensuring that the virtual object does not present itself in a manner inconsistent with those constraints. For example, the shell can specify a maximum size or a shape for the virtual object in the current display mode. Process 500 can then return to block 506 to await a further change in context factors to report to the virtual object.

Figure 6:
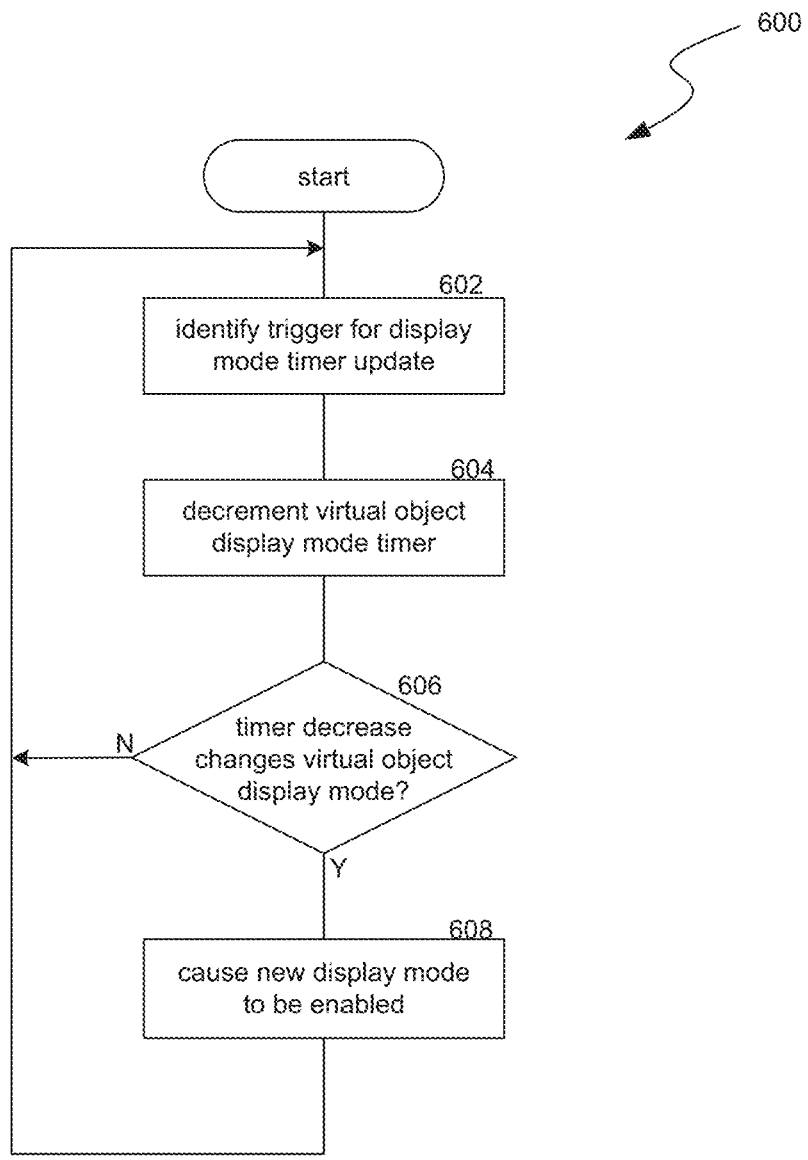
FIG. 6 is a flow diagram illustrating a process used in some implementations of the present technology for decrementing a display mode timer of a virtual object and setting a display mode for the virtual object according to the display mode timer.

FIG. 6 is a flow diagram illustrating a process 600 used in some implementations of the present technology for decrementing a display mode timer of a virtual object and setting a display mode for the virtual object according to the display mode timer. Process 600 can begin execution in response to creation of an object with an associated display mode timer (e.g., block 502 of FIG. 5). In some implementations, process 600 can be paused or disabled when the display mode timer is paused or disabled, e.g., if a virtual object is in a mode to keep it in a current display mode (such as when the virtual object is providing active output or otherwise in a keep-active mode).

At block 602, process 600 can identify a trigger for updating the display mode timer. In some implementations, this trigger can be periodic, e.g., a trigger that occurs every 0.1, 0.5, or 1 second. At block 604, process 600 can decrement the display mode timer. In some implementations, the amount decremented can correspond to the period between the triggers used at block 602. In some implementations where the display mode timer has an associated countdown speed property (discussed above), the amount the display mode timer is decremented can be weighted based on the value of the countdown speed property.

At block 606, process 600 can determine whether the current state of the display mode timer, with the decrement made at block 604, indicates the current amount of time on the display mode timer is mapped to a display mode other than a current display mode of the virtual object. If so, process 600 can proceed to block 608. Otherwise, process 600 can return to block 602.

At block 608, process 600 can cause the new display mode that corresponds to the current state of the display mode timer to be enabled. This can include indicating to the virtual object which display mode to enable. In some implementations, this can also include the artificial reality system shell enabling constraints corresponding to the new display mode, ensuring that the virtual object does not present itself in a manner inconsistent with those constraints. For example, the shell can specify a maximum size or a shape for the virtual object in the current display mode. Process 600 can then return to block 602 to await the next display mode timer update trigger.

Figure 7A:
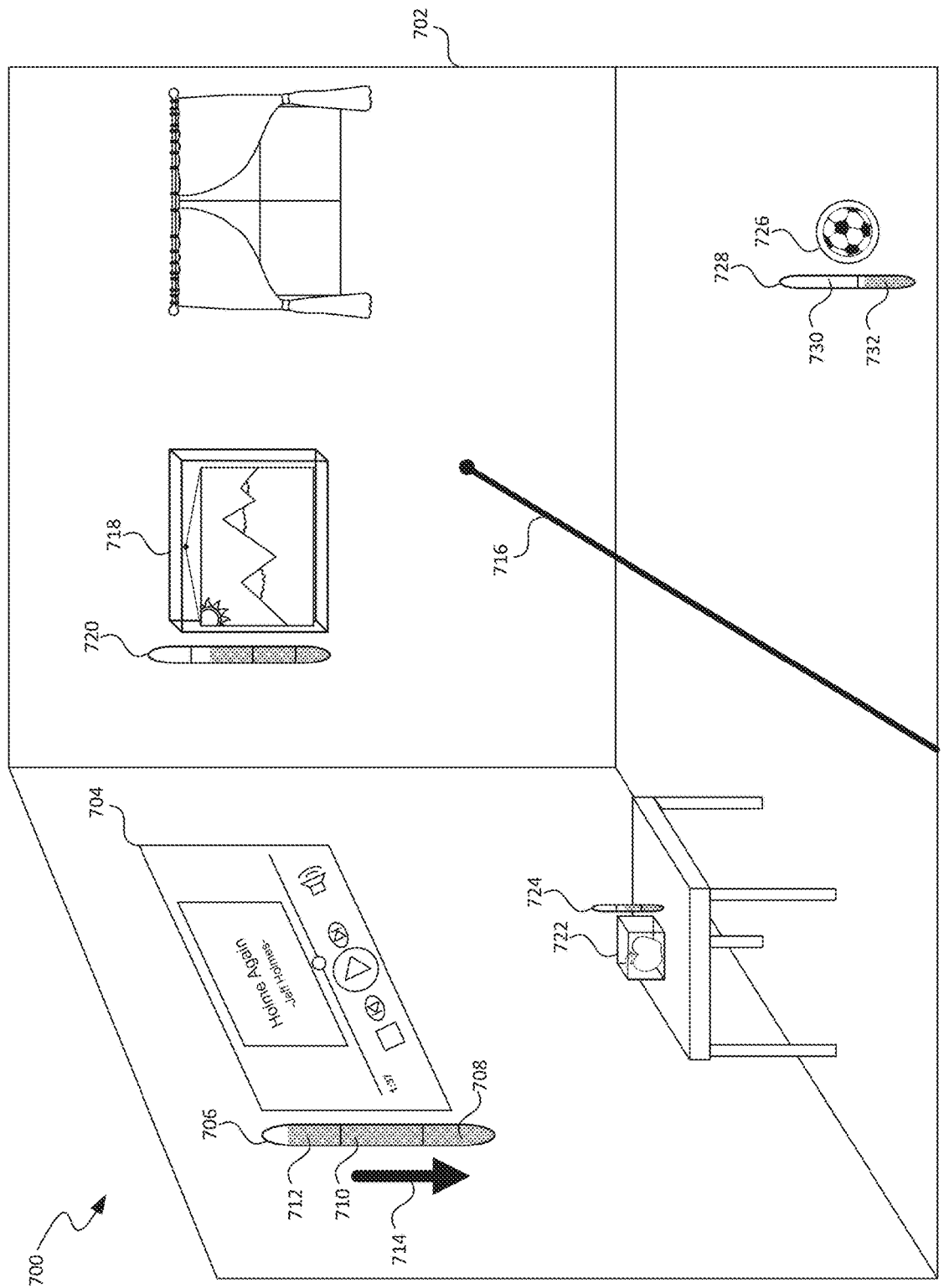
FIG. 7A is a conceptual diagram illustrating an example virtual object, in a maximized display mode, with a display mode timer controlled by user gaze and power level context factors.

FIG. 7A is a conceptual diagram illustrating an example 700 with a virtual object 704, in a maximized display mode, with a display mode timer 706 controlled by user gaze and power level context factors. Example 700 show artificial reality environment 702 which includes a music player virtual object 704, a picture virtual object 718, an apple virtual object 722, and a soccer ball virtual object 728. Each of these virtual objects is associated with a display mode timer: music player 704 is associated with display mode timer 706, picture 718 is associated with display mode timer 720, apple 722 is associated with display mode timer 724, and soccer ball 726 is associated with display mode timer 728. In example 700, the display mode timers 706, 720, 722, and 728 are illustrated as being displayed in the artificial reality environment. However, in some cases the display mode timers are not visually perceptible in the artificial reality environment. As illustrated by the segmentation of the display mode timers 706, 720, 722, and 728 (such as segments 708, 710, and 712 of display mode timer 706), the display mode timers 706, 720, 722, and 728 are divided into ranges corresponding to different display modes. In example 700, the display mode timers 706, 720, 722, and 728 each have a different range segmentation. For example, display mode timer 706 has range 708 corresponding to glint display mode, range 710 corresponding to minimized display mode, and range 712 corresponding to maximized display mode, while display mode timer 728 has range 732 corresponding to glint display mode and range 730 corresponding to maximized display mode. In FIG. 7A, display mode timer 706 has time in range 712, causing virtual object 704 to be in maximized display mode—displayed at full size with all its associated controls. Display mode timer 728 has time in range 732, causing virtual object 726 to be in glint display mode—displaying only a "coin" shape with an icon for the content of the virtual object 726.

Example 700 also includes a countdown speed 714, as a property of the display mode timer 706. Countdown speed 714 is illustrated as an arrow with a magnitude of the arrow tail signifying the speed at which time is decremented from the display mode timer 706. In example 700, the countdown speed 714 is illustrated as being displayed in the artificial reality environment. However, in some cases the countdown speed 714 is not visually perceptible in the artificial reality environment but is tracked as a property of the display mode timer 706. The artificial reality system controlling artificial reality environment 702 is also tracking a variety of context factors, including user focus 716.

Figure 7B:
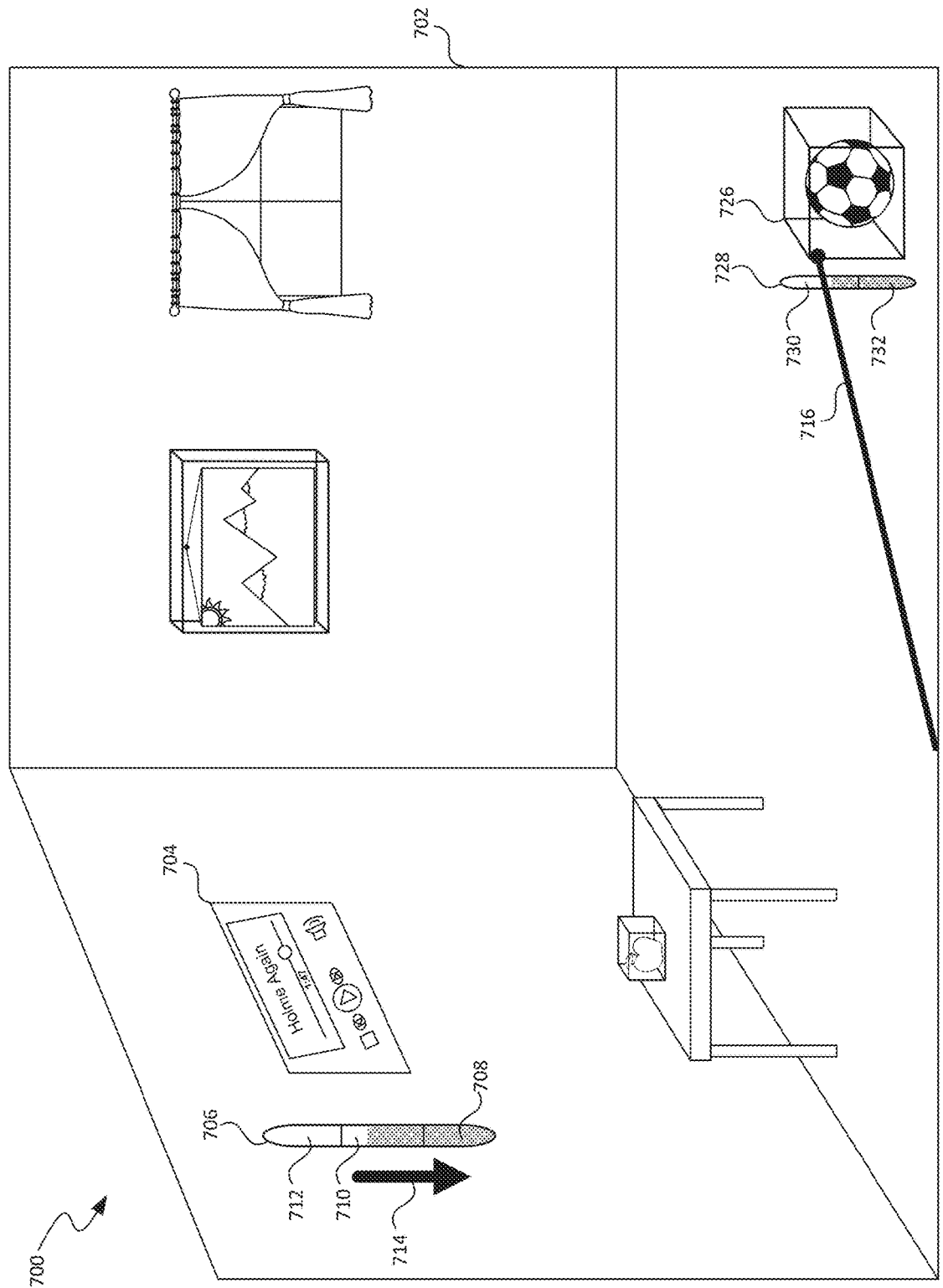
FIG. 7B is a conceptual diagram illustrating the example virtual object with the display mode timer decreased to a level causing a change to a minimized display mode.

FIG. 7B is a conceptual diagram illustrating the example 700 with virtual object 704 where the display mode timer 706 has decreased to time in range 710. This caused the display mode of the music player virtual object 704 to change to a minimized display mode. The minimized display mode includes a constraint to decrease the virtual object 704's size by half. The virtual object 704 is configured to change the size of and rearrange the content items it displays to conform to the decreased size in this minimized display mode. As also seen in FIG. 7B, user focus 716 has been directed to the soccer ball virtual object 726, causing time to be added to display mode timer 728. The time added to display mode timer 728 has moved it into the 730 range, causing the soccer ball 726 to be displayed in maximized mode.

Figure 7C:
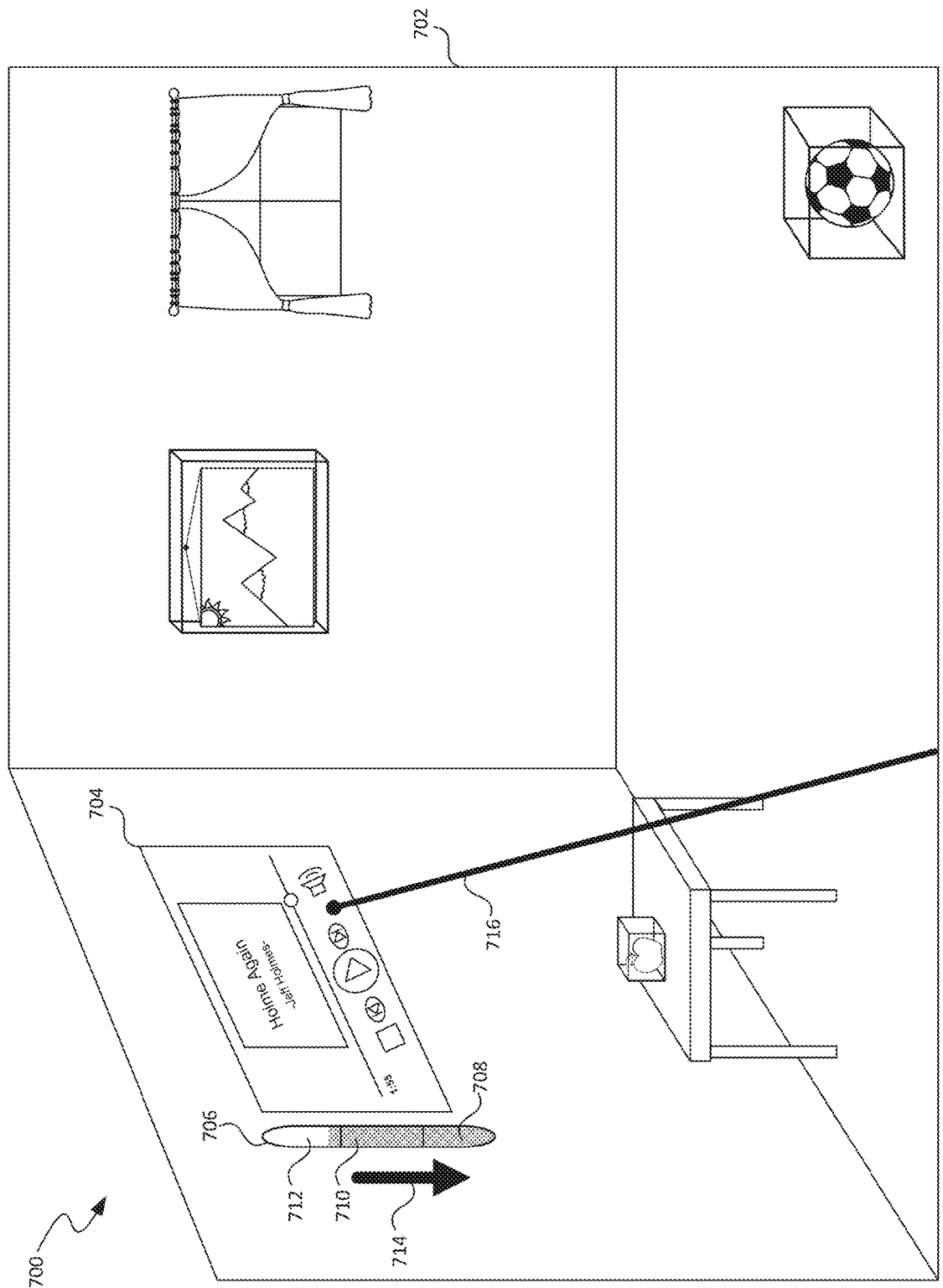
FIG. 7C is a conceptual diagram illustrating the example virtual object with the display mode timer increased based on a user gaze directed at the virtual object, causing a change back to the maximized display mode.

FIG. 7C is a conceptual diagram illustrating the example 700 with virtual object 704 where the display mode timer 706 has increased based on a user gaze 716 being directed at the virtual object 704. The time added to display mode timer 706 has moved it back into the 712 range, causing the media player virtual object 704 to be again displayed in maximized mode.

Figure 7D:
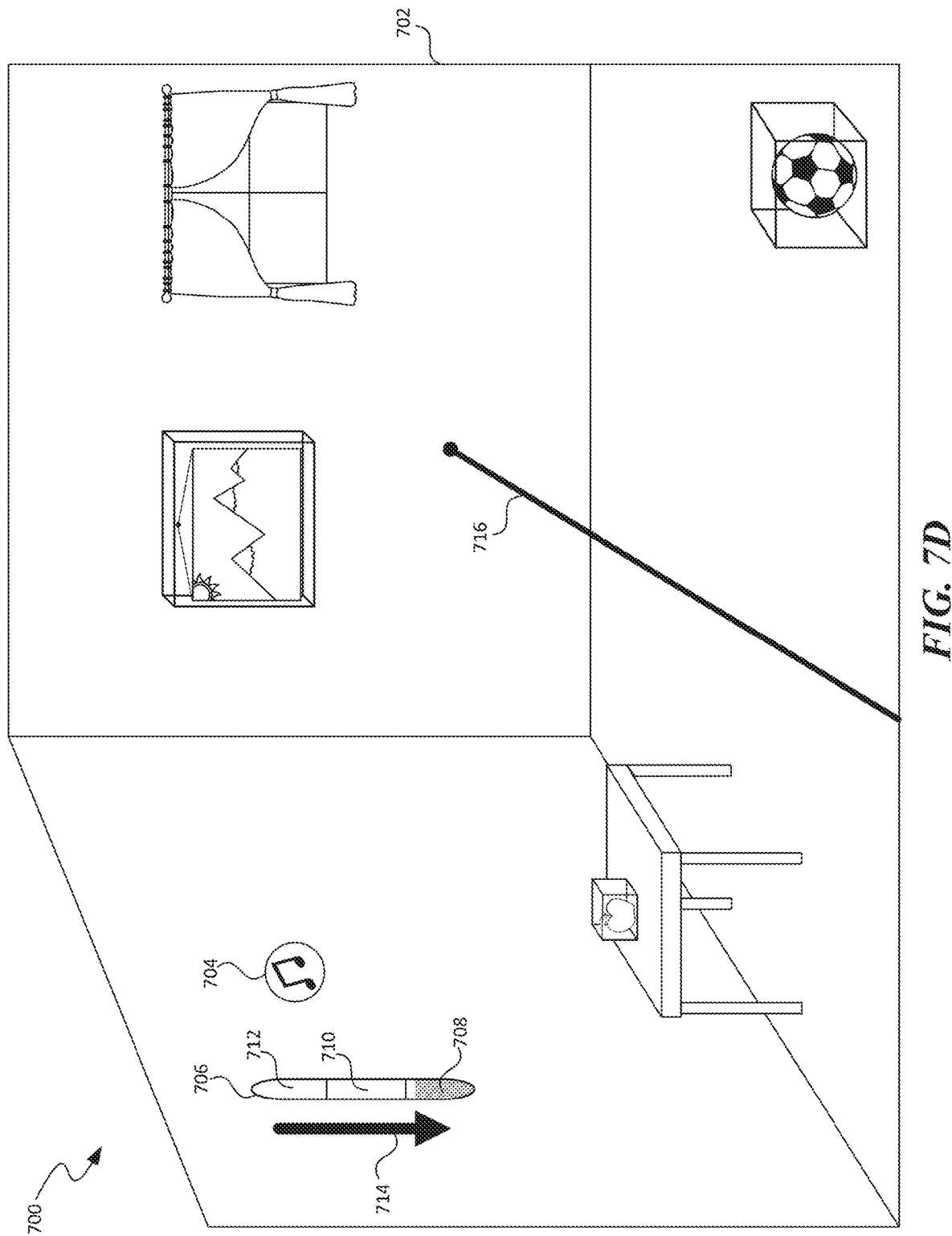
FIG. 7D is a conceptual diagram illustrating the example virtual object with the rate at which the display mode timer decrements increased, and the display mode timer decreased to a level causing a change to a glint display mode.

FIG. 7D is a conceptual diagram illustrating the example 700 with virtual object 704 where the countdown speed 714 (the rate at which the display mode timer 706 decrements) has increased. In example 700, this has occurred in response to a context factor specifying that a mode of the artificial reality system is "power saving." As the display mode timer 706 has counted down at this increased rate, display mode timer 706 entered range 708. Range 708 is mapped to glint mode, so the media player virtual object 704 is displayed in glint mode—shown as an icon of a specified size.

Figure 7E:
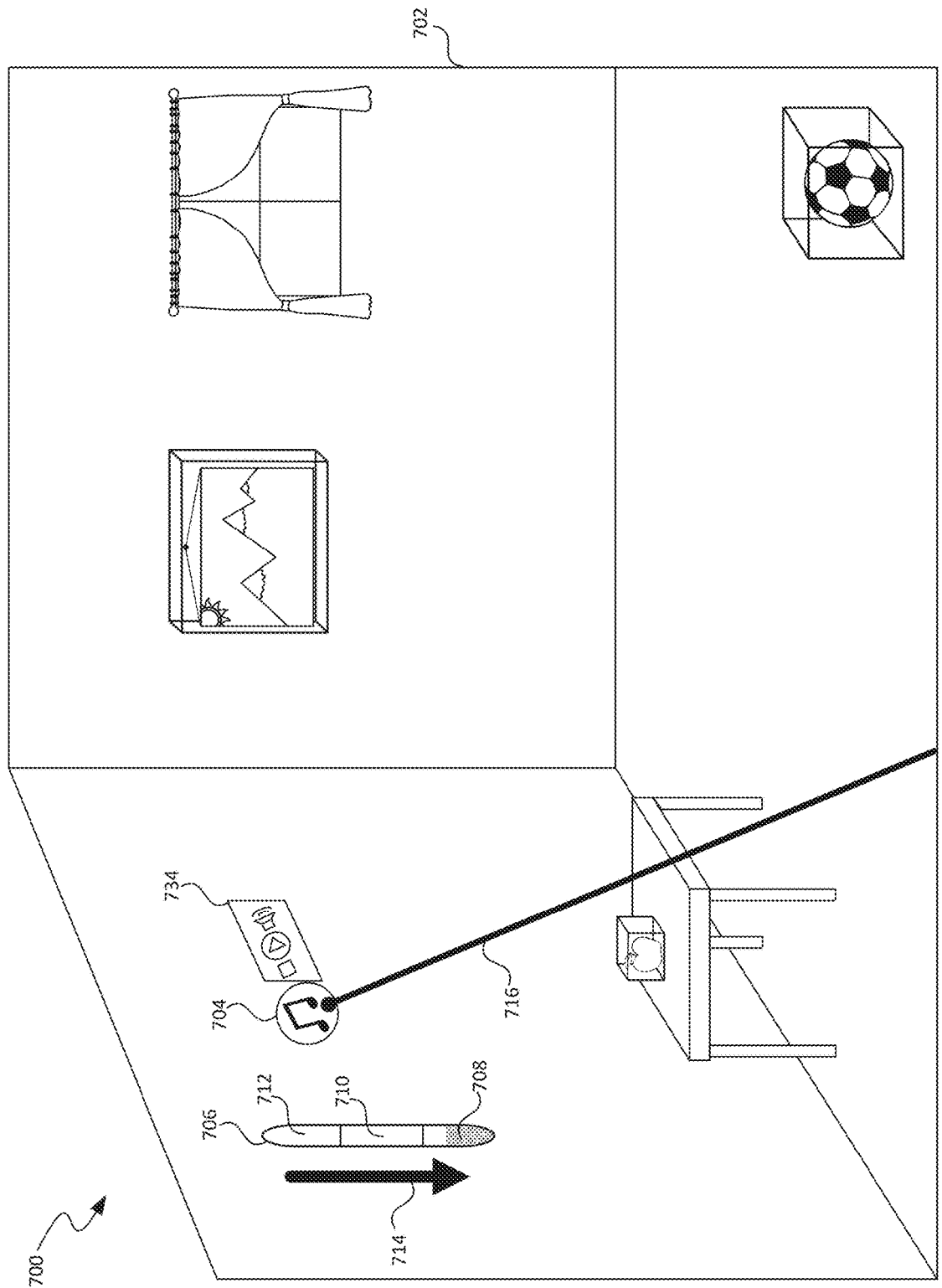
FIG. 7E is a conceptual diagram illustrating the example virtual object remaining in the glint mode while adding key actions in response to the user gaze being again directed at the virtual object.
Figure 7F:
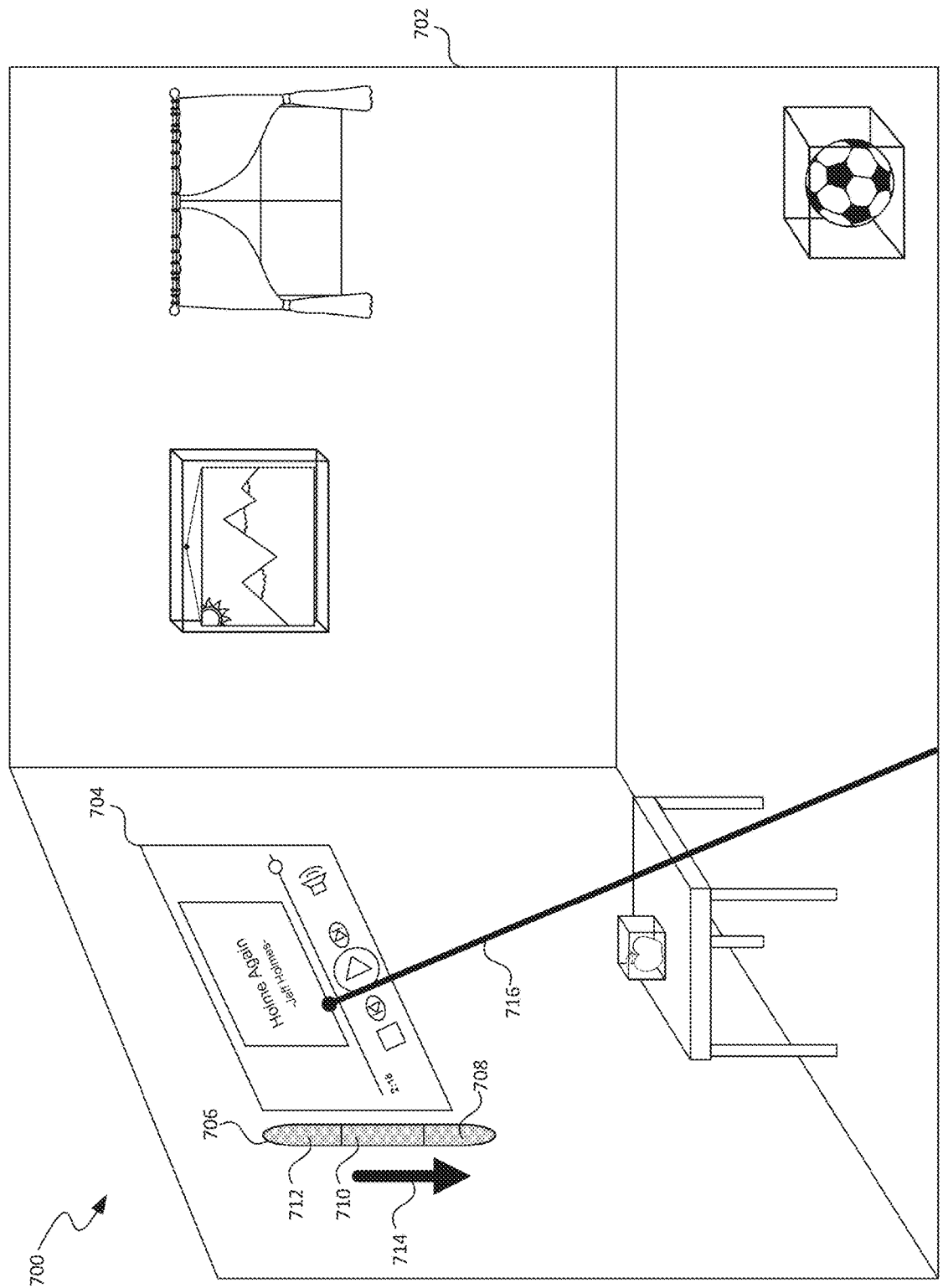
FIG. 7F is a conceptual diagram illustrating the example virtual object returning to maximized mode in response to a user maximization gesture while the user gaze is directed at the virtual object.

FIG. 7E is a conceptual diagram illustrating the example 700 virtual object 704 remaining in the glint mode, adding key actions 734. In example 700, once virtual object 704 has entered glint display mode, it is configured to remain in glint display mode until the user is focused on the virtual object 704 and performs a maximization gesture. Thus, user focus 716 being directed at virtual object 704 alone does not add time to display mode timer 706. However, virtual object 704 is configured to also enter key-actions display mode when it is in glint display mode and the user's focus 716 is directed at it. As shown in FIG. 7E, key-actions display mode causes key actions 734 to be displayed relative to virtual object 704. Key actions 734 include the controls determined most likely to be used for the corresponding virtual object 704. In this case, virtual object 704 is a music player and the key actions include a stop control, a play control, and a volume control. In FIG. 7F, the user has kept her focus 716 on the virtual object 704 and has performed the maximization gesture (not shown). This causes display mode timer 706 to be set to its maximum level. The time added to display mode timer 706 has moved it back into the 712 range, causing the media player virtual object 704 to be once again displayed in maximized mode.

Reference in this specification to "implementations" (e.g., "some implementations," "various implementations," "one implementation," "an implementation," etc.) means that a particular feature, structure, or characteristic described in connection with the implementation is included in at least one implementation of the disclosure. The appearances of these phrases in various places in the specification are not necessarily all referring to the same implementation, nor are separate or alternative implementations mutually exclusive of other implementations. Moreover, various features are described which may be exhibited by some implementations and not by others. Similarly, various requirements are described which may be requirements for some implementations but not for other implementations.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle-specified number of items, or that an item under comparison has a value within a middle-specified percentage range. Relative terms, such as high or unimportant, when not otherwise defined, can be understood as assigning a value and determining how that value compares to an established threshold. For example, the phrase "selecting a fast connection" can be understood to mean selecting a connection that has a value assigned corresponding to its connection speed that is above a threshold.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

Any patents, patent applications, and other references noted above are incorporated herein by reference. Aspects can be modified, if necessary, to employ the systems, functions, and concepts of the various references described above to provide yet further implementations. If statements or subject matter in a document incorporated by reference conflicts with statements or subject matter of this application, then this application shall control.

We claim:

1. A method for displaying a virtual object in an artificial reality environment, the method comprising:
    causing a display mode timer to be associated with the virtual object, wherein multiple ranges of the display mode timer are each mapped to one of multiple display modes and the display mode timer elapses at a specified rate;
    identifying one or more context factors specifying conditions related to the artificial reality environment, wherein at least one of the one or more context factors indicates a user focus in the artificial reality environment;
    evaluating, based on the one or more context factors, one or more rules for the virtual object;
    in response to the evaluating, including determining that the user focus is on the virtual object, adding time to the display mode timer;
    determining that the time added to the display mode timer caused the display mode timer to have an amount of time in one of the multiple ranges mapped to a new display mode other than a current display mode of the virtual object; and
    causing the virtual object to change to the new display mode.

2. The method of claim 1,
    wherein the specified rate for the display mode timer is variable depending on at least one of the one or more context factors; and
    wherein the method further comprises increasing the specified rate in response to a determination, based on the one or more context factors, including one or more of:
        that an amount of space the virtual object takes on a display is above a threshold space;
        that a power saving mode has been enabled;
        that the virtual object is above a threshold distance, in the artificial reality environment, from a user; or
        any combination thereof.

3. The method of claim 1, wherein the specified rate for the display mode timer is variable depending on at least one of the one or more context factors.

4. The method of claim 1, wherein the new display mode is a maximized display mode in which the virtual object can use a full amount of a volume allocated for that virtual object.

5. The method of claim 1, wherein the new display mode is a minimized display mode in which a constraint is set such that the virtual object can use less than a full amount of a volume allocated for that virtual object.

6. The method of claim 1,
    wherein the new display mode is a glint display mode in which a constraint is set such that the virtual object is displayed in a shape specified for all virtual objects that are in the glint display mode; and
    wherein, when the virtual object is in the glint display mode, causing the virtual object to enable a display mode other than the glint display mode requires a user interaction specified for exiting glint mode.

7. The method of claim 1, wherein the new display mode is a glint display mode in which a constraint is set such that the virtual object is displayed in a shape specified for all virtual objects that are in the glint display mode.

8. The method of claim 1,
    wherein one of the multiple display modes includes a key-actions configuration in which certain controls are displayed in relation to the virtual object; and
    wherein the certain controls are controls identified as most often used in relation to the virtual object.

9. The method of claim 1,
    wherein the new display mode is associated with one or more constraints including:
        how much of a display the virtual object can use, or where in the artificial reality environment the virtual object can be placed; and wherein, when the virtual object changes to the new display mode, the one or more constraints associated with the new display mode are enforced.

10. The method of claim 1,
wherein the virtual object is part of a cluster of multiple virtual objects;
wherein the cluster of multiple virtual objects was defined based on one or more of:
having been created by the same entity,
having a common specified type,
having been grouped by a user, or
any combination thereof; and
wherein the display mode timer associated with the virtual object is:
assigned to the cluster of multiple virtual objects; or
is synchronized with one or more other display mode timers associated with one or more of the multiple virtual objects.

11. The method of claim 1,
wherein the virtual object is part of a cluster of multiple virtual objects; and
wherein the display mode timer associated with the virtual object is:
assigned to the cluster of multiple virtual objects; or
is synchronized with one or more other display mode timers associated with one or more of the multiple virtual objects.

12. The method of claim 1, wherein the evaluating the one or more rules for the virtual object includes determining that the user focus is directed at the virtual object.

13. A computer-readable storage medium storing instructions that, when executed by a computing system, cause the computing system to perform a process for displaying a virtual object in an artificial reality environment, the process comprising:
receiving one or more context factors specifying conditions related to the artificial reality environment;
evaluating, based on the one or more context factors, one or more rules for the virtual object;
in response to the evaluating, adding time to a display mode timer associated with the virtual object, wherein multiple ranges of the display mode timer are each mapped to one of multiple display modes;
determining that the time added to the display mode timer caused the display mode timer to have an amount of time in one of the multiple ranges mapped to a new display mode other than a current display mode of the virtual object; and
causing the virtual object to change to the new display mode.

14. The computer-readable storage medium of claim 13, wherein the one or more context factors include:
user proximity, in the artificial reality environment, to the virtual object;
that a user input has been provided in relation to the virtual object;
a current mode of an artificial reality system in control of the artificial reality environment;
an amount of power used to display the virtual object; or
any combination thereof.

15. The computer-readable storage medium of claim 13, wherein the process further comprises determining that the virtual object is providing active output and, in response, preventing a further change in display mode while the virtual object is providing the active output.

16. The computer-readable storage medium of claim 13,
wherein the display mode timer elapses at a specified rate; and
wherein the process further comprises increasing the specified rate in response to a determination, based on the one or more context factors, including one or more of:
that a power saving mode has been enabled;
that the virtual object is above a threshold distance, in the artificial reality environment, from the user; or
any combination thereof.

17. The computer-readable storage medium of claim 13,
wherein the one or more context factors specify at least a user gaze direction; and
wherein the evaluating the one or more rules for the virtual object includes determining that the user gaze direction is directed at the virtual object.

18. A computing system for displaying a virtual object in an artificial reality environment, the computing system comprising:
one or more processors; and
one or more memories storing instructions that, when executed by the one or more processors, cause the computing system to perform a process comprising:
causing a display mode timer to be associated with the virtual object, wherein multiple ranges of the display mode timer are each mapped to one of multiple display modes and the display mode timer elapses at a specified rate, and wherein the multiple ranges of the display mode timer include at least three ranges;
in response to the display mode timer elapsing, determining that the display mode timer has an amount of time in one of the multiple ranges that is mapped to a new display mode other than a current display mode of the virtual object; and
causing the virtual object to change to the new display mode.

19. The computing system of claim 18,
wherein the process further comprises:
receiving one or more context factors specifying conditions related to the artificial reality environment; and
based on the one or more context factors, adding time to the display mode timer associated with the virtual object; and
wherein the one or more context factors include:
that a user input has been provided in relation to the virtual object;
a current mode of an artificial reality system in control of the artificial reality environment;
that the virtual object is providing active output; or
any combination thereof.

20. The computing system of claim 18,
wherein one of the multiple display modes includes a key-actions configuration in which certain controls are displayed in relation to the virtual object; and
wherein the certain controls are controls identified as most often used in relation to the type of virtual object corresponding to the virtual object.

* * * * *